United States Patent
Wilhelm et al.

(10) Patent No.: US 12,085,926 B2
(45) Date of Patent: *Sep. 10, 2024

(54) SYSTEM AND METHOD FOR REMOTE STRUCTURAL HEALTH MONITORING

(71) Applicant: MISTRAS Group, Inc., Princeton Junction, NJ (US)

(72) Inventors: Andrew Wilhelm, Princeton Junction, NJ (US); Ryan J. Streeter, Antioch, CA (US); Dimitri T. Grammatikopoulos, Staten Island, NY (US); Kenneth L. Brister, Moss Point, MS (US); Rich J. Mills, Houston, TX (US)

(73) Assignee: Mistras Group, Inc., Princeton Junction, NJ (US)

( * ) Notice: Subject to any disclaimer, the term of this patent is extended or adjusted under 35 U.S.C. 154(b) by 9 days.

This patent is subject to a terminal disclaimer.

(21) Appl. No.: 17/373,685

(22) Filed: Jul. 12, 2021

(65) Prior Publication Data
US 2021/0341912 A1 Nov. 4, 2021

Related U.S. Application Data

(63) Continuation of application No. 16/788,236, filed on Feb. 11, 2020, now Pat. No. 11,126,170.

(51) Int. Cl.
*G06Q 50/163* (2024.01)
*G05B 23/02* (2006.01)
*H04L 67/12* (2022.01)

(52) U.S. Cl.
CPC ..... *G05B 23/0221* (2013.01); *G05B 23/0272* (2013.01); *G05B 23/0283* (2013.01);
(Continued)

(58) Field of Classification Search
CPC ............ G05B 23/0221; G05B 23/0272; G05B 23/0283; G05B 2223/06; G06Q 50/163; H04L 67/12
See application file for complete search history.

(56) References Cited

U.S. PATENT DOCUMENTS 7,289,567 B2 * 10/2007 Classon ................ H04L 1/1819
370/464
7,831,628 B1 11/2010 Silva et al.
(Continued)

FOREIGN PATENT DOCUMENTS

CA 2 756 486 A1 4/2013
EP 3 279 871 A1 2/2018

OTHER PUBLICATIONS

European Patent Office, Communication, Extended European Search Report issued for European Application No. 21156652.6, dated Jul. 8, 2021, 9 pages.

*Primary Examiner* — Manuel A Rivera Vargas
(74) *Attorney, Agent, or Firm* — Norton Rose Fulbright US LLP

(57) ABSTRACT

A method includes determining, based on physical characteristics indicated by first data, a plurality of sensor operations associated with a plurality of structures. The method further includes updating a structural health management system to indicate the plurality of sensor operations and, after updating the structural health management system, sending a plurality of notifications to the plurality of portable field devices. The method further includes receiving, in response to sending the plurality of notifications, second data from the plurality of portable field devices indicating results of the plurality of sensor operations. The results are generated by a plurality of tools used to perform the plurality of sensor operations. The method further includes performing, based on the results of the plurality of sensor operations, (Continued)

a plurality of remote structural health monitoring operations to determine one or more structural health characteristics of each structure of the plurality of structures.

20 Claims, 13 Drawing Sheets

(52) U.S. Cl.
CPC ........... *G06Q 50/163* (2013.01); *H04L 67/12* (2013.01); *G05B 2223/06* (2018.08)

(56) References Cited

U.S. PATENT DOCUMENTS

| | | |
|---|---|---|
| 7,869,944 B2 | 1/2011 | Deaton et al. |
| 8,300,922 B1 | 10/2012 | Garvey, III |
| 8,549,932 B1 | 10/2013 | Schultz et al. |
| 9,064,290 B2 | 6/2015 | Kneppers et al. |
| 9,081,917 B2 | 7/2015 | Currin et al. |
| 9,158,869 B2 | 10/2015 | Labrie et al. |
| 9,217,999 B2 | 12/2015 | Domke et al. |
| 10,325,298 B2 | 6/2019 | Soorianarayanan et al. |
| 10,437,203 B2 | 10/2019 | Laflen et al. |
| 2005/0075846 A1* | 4/2005 | Kim .................... G01N 29/245 703/1 |
| 2005/0114045 A1* | 5/2005 | Giurgiutiu ......... G01N 29/4445 702/35 |
| 2007/0118258 A1* | 5/2007 | Probst .................... G01M 17/04 702/108 |
| 2011/0035167 A1 | 2/2011 | Qing et al. |
| 2014/0207417 A1 | 7/2014 | Messinger et al. |
| 2014/0380433 A1* | 12/2014 | Yerger .................... H04L 69/08 726/4 |
| 2016/0377506 A1* | 12/2016 | Bizub .................... G01H 1/006 702/35 |
| 2017/0117064 A1 | 4/2017 | Lepine et al. |
| 2018/0025392 A1 | 1/2018 | Helstab |
| 2018/0329904 A1 | 11/2018 | Gupta et al. |
| 2018/0346150 A1 | 12/2018 | Remond et al. |
| 2019/0138995 A1 | 5/2019 | Currin et al. |
| 2019/0279012 A1 | 9/2019 | Birge |
| 2020/0056964 A1* | 2/2020 | Mita .................... G01M 99/008 |
| 2021/0175969 A1* | 6/2021 | Zhou .................... H04B 10/5563 |

* cited by examiner

FIG. 3B

| Analysis Type | LocationNo | Access | LocStatus | ComponentType | Size |
|---|---|---|---|---|---|
| ○ US | 404_US | SCAFFOLD | Completed | PIPE | 6 |
| ○ US | 408_US | SCAFFOLD | InProgress | ELBOW | 6 |

Functional Location

Functional Location Description — FL Last Measure

Functional Location Status — Min Due Date

Location Files

Please select sensor operation
0 rows selected

Select all — 372

1 TML in this Functional Location is not assigned to you — 376

364 — View/Update Attachments
366 — Skip
368 — Review/Sign
370 — Record Measurements

SYSTEM AND METHOD FOR REMOTE STRUCTURAL HEALTH MONITORING

CROSS-REFERENCE TO RELATED APPLICATIONS

The present application is a continuation of U.S. patent application Ser. No. 16/788,236 filed Feb. 11, 2020 and entitled "SYSTEM AND METHOD FOR REMOTE STRUCTURAL HEALTH MONITORING," the disclosure of which is incorporated by reference herein in its entirety.

TECHNICAL FIELD

The present application is directed to structural health monitoring and more particularly to a remote computing device that performs remote structural health monitoring.

BACKGROUND

Industries such as manufacturing, oil, gas, electricity, aerospace, and others use infrastructure to provide goods and services to customers. For example, a pipeline can be used to transport a substance (e.g., oil or gas) from one location to another location.

Pipelines and other infrastructure components are subject to physical wear, such as corrosion, cracking, fatigue, and other damage. For example, a pipeline may be subject to internal damage, such as wear caused by pressure and temperature changes from gas or oil conveyed within the pipeline. Further, the pipeline may be subject to external wear, such as damage caused by inclement weather and other events.

Pipelines and other infrastructure components can be inspected for wear, such as by performing an imaging operation using ultrasonic imaging, radiography, or other techniques. For example, a pipeline can be imaged to generate image data, and the image data can be analyzed to detect physical wear of the pipeline. In some cases, structures are repaired or replaced based on inspection results.

Generation, storage, transmission, and analysis of inspection data uses computing resources and is time consuming. For example, analysis of imaging data may use a large amount of processor cycles and other resources to search the imaging data for corrosion, cracking, fatigue, or other damage. In some cases, defects may be detected too late to correct or mitigate certain types of damage.

SUMMARY

According to aspects of the present disclosure, systems, apparatuses, methods, and computer-readable storage media provide functionality that facilitates remote structural health monitoring. The remote structural health monitoring is performed using a remote computing device (e.g., a cloud computing device). The remote computing device is configured to receive, from a plurality of portable field devices, results of sensor operations performed to image a plurality of structures. The remote computing device performs remote structural health monitoring based on the results of the sensor operations, such as by analyzing the results of the sensor operations to identify or predict physical wear associated with a structure (e.g., a pipeline component, a wind turbine component, a bridge support component, a building support component, or another infrastructure component, as non-limiting examples). In an illustrative example, the remote computing device performs remote structural health monitoring in real time or near-real time (e.g., while the plurality of portable field devices is located at the plurality of structures). As a result, system performance is improved as compared to certain conventional systems that perform structural health analysis off-site (e.g., after leaving an imaging location) or that carry analysis equipment on-site to an imaging location.

To illustrate, certain conventional techniques perform structural health analysis off-site (e.g., at an analysis facility) after leaving an imaging location. By performing structural health analysis off-site, such techniques avoid carrying analysis equipment on-site, which may reduce expenses associated with conveying analysis equipment. However, performing structural health analysis off-site can be time consuming. In some cases, results of the structural health analysis generated off-site may indicate that a particular structure should be re-imaged, necessitating multiple visits to the imaging location.

Other conventional techniques perform on-site analysis by carrying analysis equipment to an imaging location, such as by driving a truck or a van loaded with analysis equipment to the imaging location. Such a technique may avoid the need for multiple visits to the imaging location. In some cases, an on-site analysis technique is expensive or infeasible, such as where access to an imaging location is limited. As an illustrative example, a pipeline may extend over a mountain, through a small tunnel in a mountain, or underwater, etc.

By using a remote computing device, a structural health monitoring operation in accordance with aspects of the disclosure accrues the benefits of both an off-site analysis technique and an on-site analysis technique. For example, a structural health monitoring operation in accordance with aspects of the disclosure may avoid the expense of carrying or conveying analysis equipment while also enabling structural health analysis to be performed while sensor equipment is still on-site (thus avoiding or reducing a number of visits to the imaging location and also enabling access to imaging locations with limited accessibility).

To further illustrate, performing remote structural health monitoring by the remote computing device may enable real time or near-real time analysis of results, improving system operation and efficiency. For example, upon performing a sensor operation at a particular location, a portable field device may send results of the sensor operation to the remote computing device (e.g., via a cellular network, a satellite network, or a Wi-Fi network ("Wi-Fi" is a trademark of Wi-Fi Alliance of Austin, Texas), as illustrative examples), and the remote computing device may perform analysis of the results while the portable field device is at the particular location. In some cases, the remote computing device may prompt the portable field device, based on the results, to perform a particular operation, such as to repeat the sensor operation or to perform another type of sensor operation. In this example, one or more sensor operations can be performed on an "as needed" basis, reducing the number of unneeded sensor operations. Alternatively or in addition, in another example, the remote computing device may notify the portable field device to recalibrate a tool used to generate the results (e.g., in response to determining that the results are outside a tolerance range for the particular type of measurement).

In some cases, remote structural health monitoring by the remote computing device using the structural health management system improves system efficiency, such as by facilitating efficient distribution of the sensor operations among projects or by enabling aggregation of results of the sensor operations, as illustrative examples. For example, in some cases, the structural health management system is configured to track projects to ensure that the same sensor operation (or similar sensor operations) are not duplicated among multiple projects. As another example, in some implementations, the structural health management system is configured to perform data analytics operations based on results of sensor operations, such as by generating key performance indicators (KPIs) associated with the results or by determining that infrastructure components within a particular geographic region are subject to an amount of damage that is statistically significant.

As used herein, "structural health" is used broadly to refer to the integrity or condition of any structure. For example, structural health may be determined by identifying the integrity or condition of structures (e.g., pipe supports, racks, skirts, etc.) that support process systems (e.g., piping, pressure, vessels, columns, or towers, etc.). As another example, structural health may be determined by identifying the integrity or condition process systems (e.g., piping, pressure, vessels, columns, or towers, etc.).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 3B is a diagram illustrating another particular illustrative example of the GUI of FIG. 3A in accordance with aspects of the disclosure.

DETAILED DESCRIPTION

The detailed description set forth below, in connection with the appended drawings and presentations, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Figure 1A:
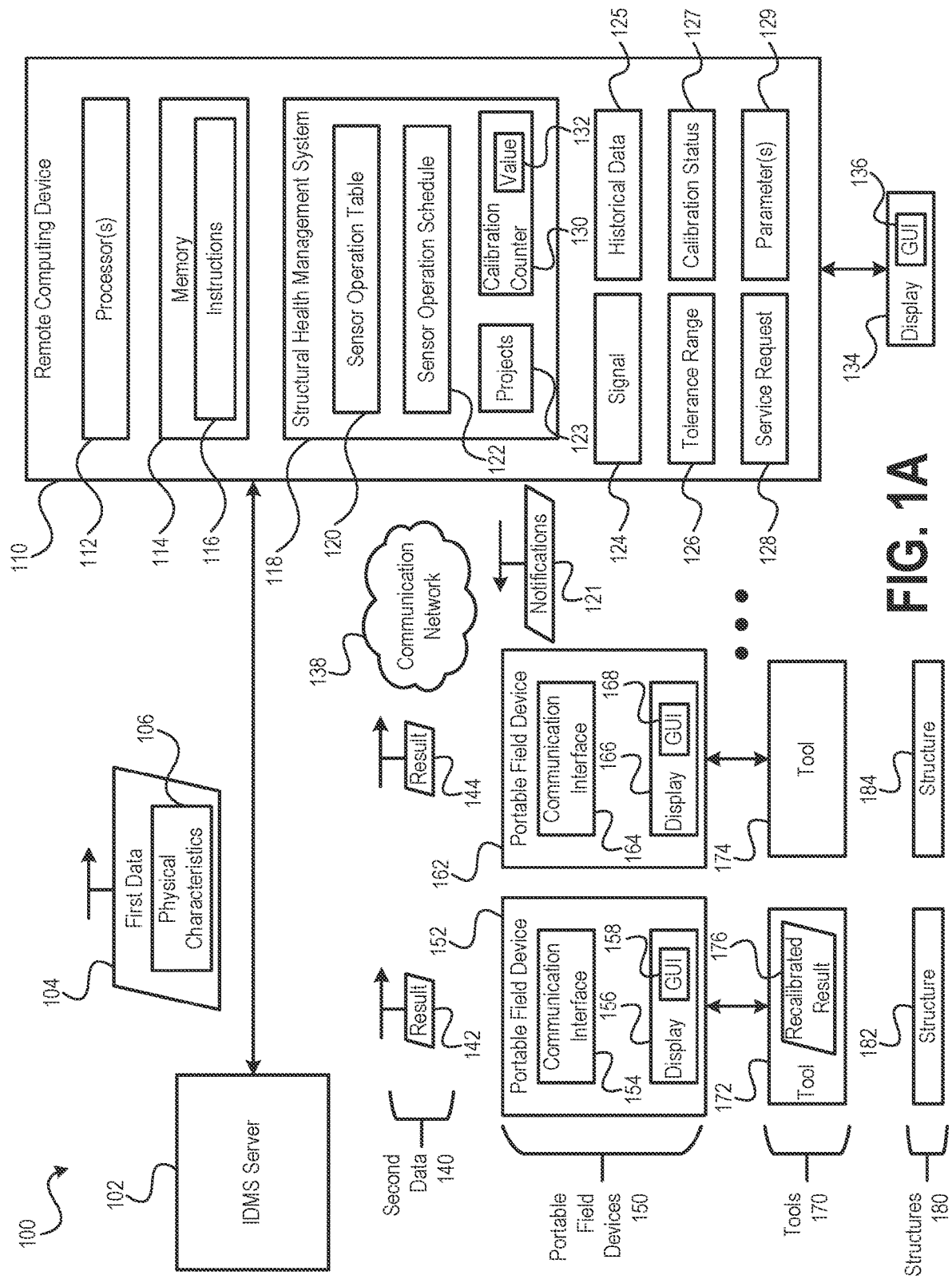
FIG. 1A is a diagram illustrating a particular illustrative example of a system that includes a plurality of portable field devices and a remote computing device that is configured to perform remote structural health monitoring in accordance with aspects of the disclosure.

Referring to FIG. 1A, a particular example of a system for performing remote structural health monitoring is depicted and generally designated 100. The system 100 includes a remote computing device 110. The remote computing device 110 may include one or more standalone servers or may be provided via a cloud-based system having a plurality of processing resources configured to perform the functions described herein with respect to the remote computing device 110.

In the example of FIG. 1A, the system 100 further includes one or more servers coupled to the remote computing device 110, such as an inspection database management system (IDMS) server 102. The IDMS server 102 may include one or more standalone servers or may be provided via a cloud-based system having a plurality of processing resources configured to perform the functions described herein with respect to IDMS server 102.

The system 100 further includes a plurality of portable field devices 150. In FIG. 1A, the plurality of portable field devices 150 includes a portable field device 152 and a portable field device 162. In some examples, each of the plurality of portable field devices 150 is configured to communicate with the remote computing device 110 using a communication network 138. The communication network 138 may include one or more of a wireless network, a cellular network, a wide area network (WAN), the Internet, or a satellite-based network, as illustrative examples. In some examples, the communication network 138 includes a plurality of devices configured to relay information between the remote computing device 110 and the plurality of portable field devices 150. As an illustrative example, the communication network 138 may include a plurality of transceivers attached or adjacent to the length of a pipeline, and the plurality of transceivers may be configured to serially relay information along the length of the pipeline.

As used herein, a device is "remote" to another device if those of skill in the art would recognize that a physical distance between the devices is such that data communication between the devices is more prone to data errors as compared to data communication between devices that are local to one another. In a particular example, a device is "remote" to another device if those of skill in the art would recognize a physical distance between the devices as involving or requiring one or more particular communication techniques to compensate for one or more characteristics associated with the physical distance, such as channel fading, as an illustrative example. To further illustrate, data communicated between devices that are remotely connected may be encoded and transmitted using one or more modulation and coding schemes (MCSs) that are not typically used or required to communicate data between local devices.

To further illustrate, each portable field device of the plurality of portable field devices 150 may include a respective communication interface configured to communicate with the remote computing device 110 using the communication network 138. In the example of FIG. 1A, the portable field device 152 includes a communication interface 154 configured to communicate with the remote computing device 110 using the communication network 138, and the portable field device 162 includes a communication interface 164 configured to communicate with the remote computing device 110 using the communication network 138.

In some implementations, one or more of the plurality of portable field devices 150 correspond to a portable computing device, such as a cellular phone, a tablet computer, or a laptop computer, as illustrative examples. Alternatively or in addition, one or more of the plurality of portable field devices 150 may correspond to a robot or an autonomous vehicle, such as an autonomous aircraft (e.g., a drone), an autonomous terrestrial vehicle, or an autonomous underwater vessel, as illustrative examples.

The system 100 further includes a plurality of tools 170, such as a tool 172 and a tool 174. Each tool of the plurality of tools 170 may include one or more sensors. For example, each tool of the plurality of tools 170 may include one or more of an ultrasonic sensor, a radiographic sensor, or a visual sensor (e.g., a camera), as illustrative examples.

The plurality of tools 170 is configured to perform imaging operations to image a plurality of structures 180. For example, in FIG. 1A, the tool 172 is configured to perform an imaging operation to image a structure 182 of the plurality of structures 180, and the tool 174 is configured to perform an imaging operation to image a structure 184 of the plurality of structures 180. A structure of the plurality of structures 180 may include a component of a pipeline (e.g., a pipe, an elbow, or a reducer, as illustrative examples), a well, a component of a building, a machine, a renewable energy collection device (e.g., a wind turbine component or a solar panel component), a bridge support component, or another structure, as illustrative examples.

Although the plurality of tools 170 is illustrated in FIG. 1A as being distinct from the plurality of portable field devices 150, it should be appreciated that the plurality of tools 170 can be mounted on or integrated within the plurality of portable field devices 150 in other implementations. As a non-limiting, illustrative example, the portable field device 152 may correspond to a robot or an autonomous vehicle, and the tool 172 may be mounted on or integrated within the portable field device 152. As another non-limiting, illustrative example, the portable field device 162 may correspond to a portable computing device (e.g., a cellular phone, a tablet computer, or a laptop computer), and the tool 174 may be mounted on or integrated within the portable field device 162.

As shown in FIG. 1A, the remote computing device 110 may include one or more processors 112 and a memory 114. The memory 114 may include one or more hard disk drives (HDDs), one or more solid state drives (SSDs), flash memory devices, read only memory (ROM) devices, random access memory (RAM) devices, or other memory devices configured to store data in a persistent or non-persistent state. In a particular example, the memory 114 is configured to store instructions 116 executable by the one or more processors 112 to perform one or more operations described in connection with the remote computing device 110.

The remote computing device 110 includes or is coupled to a structural health management system 118. In some implementations, the structural health management system 118 includes control information associated with the plurality of tools 170, such as control information that is used by the remote computing device 110 to remotely control operations of the plurality of tools 170.

The structural health management system 118 is accessible by the plurality of portable field devices 150. For example, in some implementations, one or more portable field devices of the plurality of portable field devices 150 are configured to receive data or instructions from the structural health management system 118. In some examples, the portable field device 152 includes a display 156 configured to present a graphical user interface (GUI) 158, and the GUI 158 is configured to indicate certain data of the structural health management system 118. FIG. 1A also illustrates that the portable field device 162 includes a display 166 configured to present a GUI 168 that is configured to indicate certain data of the structural health management system 118.

The example of FIG. 1A also illustrates that the remote computing device 110 may include or be coupled (e.g., via a communication network, such as the communication network 138) to a display 134 configured to present a GUI 136. Certain examples of the GUI 158 and the GUI 136 are described further below.

It is noted that the particular examples depicted in FIG. 1A are illustrative and non-limiting. For example, in other implementations, the system 100 may include a different number of portable field devices 150, a different number of tools 170, or a different number of structures 180.

During operation, the remote computing device 110 is configured to receive first data 104 from the IDMS server 102. In an illustrative example, the IDMS server 102 sends the first data 104 to the remote computing device 110 via one or more communication networks (e.g., the communication network 138 or another communication network).

The first data 104 indicates physical characteristics 106 of the plurality of structures 180. For example, the first data 104 may include or indicate one or more of text describing a structure of the plurality of structures 180, a drawing of a structure of the plurality of structures 180, a photo of a structure of the plurality of structures 180, specifications associated with a structure of the plurality of structures 180, a location of a structure of the plurality of structures 180, or historical sensor data associated with a structure of the plurality of structures 180, as illustrative examples. Alternatively or in addition, in an illustrative example, the first data 104 includes a bitmap indicating, for each physical characteristic of the physical characteristics 106, whether the physical characteristic is present at each of the plurality of structures 180.

In some examples, the one or more processors 112 are configured to perform operations to recognize structures based on the first data 104. For example, the one or more processors 112 may be configured to perform a computer vision operation to recognize one or more structures within a photo or a drawing included in the first data 104.

In some examples, the first data 104 includes a request indicating one or more sensor operations. As a non-limiting illustrative example, the request may specify a type of sensor operation to be performed on one or more structures of the plurality of structures 180, such as one or more of an ultrasonic sensor operation, a radiographic sensor operation, or a visual sensor operation (e.g., using a camera), as illustrative examples. Alternatively or in addition, a visual inspection may be performed that involves a checklist of items (e.g., insulation, structural supports, or external corrosion, etc.) to be inspected, tested, or verified. Alternatively or in addition, a weld inspection may be performed. A weld inspection may involve a non-destructive evaluation (NDE), such as magnetic testing, dye penetrant testing, positive material identification, Brinell hardness testing, ferrite testing, copper sulfate testing, weld-quality radiographic testing, or weld-quality ultrasonic testing, as illustrative examples.

In some examples, the first data 104 is received using multiple files or multiple messages. For example, a first file or message of the first data 104 may include information related to the structure 182, and a second file or message of the first data 104 may include information related to the structure 184. In another example, the first data 104 is received using a single file or a single message.

The remote computing device 110 is configured to determine, based on the first data 104, a plurality of sensor operations associated with the plurality of structures 180. In a particular example, the remote computing device 110 is configured to store the first data 104 at the memory 114, and the one or more processors 112 are configured to execute the instructions 116 to retrieve the first data 104 from the memory 114 and to determine the plurality of sensor operations associated with the plurality of structures 180.

To further illustrate, in an illustrative example, the remote computing device 110 is configured to access a sensor operation table 120 based on the first data 104 and to determine types of sensor operations based on the sensor operation table 120 (e.g., by performing a lookup operation at the sensor operation table 120 to determine the plurality of sensor operations). The sensor operation table 120 may indicate structure types and sensor operation types corresponding to the structure types. As an illustrative example, the sensor operation table 120 may indicate that a pipeline structure is to be imaged using a particular set of ultrasonic sensor operations (e.g., using four ultrasonic sensor operations at a particular distance from the pipeline structure and spaced around the pipeline structure at 0, 90, 180, and 270 degree relative angles, as an illustrative example). In other examples, a structure may be imaged using a different number of ultrasonic sensor operations (e.g., five or more ultrasonic sensor operations, as a non-limiting example).

The remote computing device 110 is configured to update the structural health management system 118 to indicate association of the plurality of sensor operations with the plurality of structures 180. For example, the one or more processors 112 are configured to execute the instructions 116 to update the structural health management system 118 to indicate association of the plurality of sensor operations with the plurality of structures 180, such as by indicating a type of sensor operation to be performed at each of the plurality of structures 180. In some examples, updating the structural health management system 118 includes adding a plurality of location identifiers to the structural health management system 118 (e.g., to indicate a location of each structure of the plurality of structures 180), adding a plurality of sensor operation identifiers to the structural health management system 118 (e.g., to indicate a type of sensor operation to be performed at each structure of the plurality of structures 180), and adding a plurality of status identifiers to the structural health management system 118 (e.g., to indicate a status of each sensor operation to be performed at the plurality of structures 180).

In some examples, one or more sensor operations of the plurality of sensor operations indicate a thickness monitoring location (TML), a condition monitoring location (CML), or a combination thereof. To illustrate, a sensor operation associated with the structure 182 may indicate a TML that identifies a particular region of the structure 182 that is to be sensed (e.g., imaged) to detect a thickness of the structure 182 (e.g., to enable detection of corrosion or other wear). Alternatively or in addition, a sensor operation associated with the structure 182 may indicate a CIVIL of the structure 182 identifying a particular condition of the structure 182 that is to be searched to detect a condition of the structure 182 (e.g., to enable detection of a crack or other wear).

In some examples, the remote computing device 110 may be configured to update the structural health management system 118 to indicate an assignment of the plurality of sensor operations to the portable field devices 150, the plurality of tools 170, or both. For example, the remote computing device 110 may be configured to update the structural health management system 118 to indicate that the portable field device 152 and the tool 172 are assigned to an imaging operation of the structure 182. As another example, the remote computing device 110 may be configured to update the structural health management system 118 to indicate that the portable field device 162 and the tool 174 are assigned to an imaging operation of the structure 184.

In some examples, the remote computing device 110 is configured to track locations of the plurality of portable field devices 150 and the plurality of tools 170 and to assign the plurality of portable field devices 150 and the plurality of tools 170 to sensor operations based on the location information. To illustrate, in some examples, the plurality of portable field devices 150 and the plurality of tools 170 include global positioning system (GPS) receivers that determine location information (e.g., GPS coordinates) and transmit the location information to the remote computing device 110 (e.g., using the communication network 138). Alternatively or in addition, the location information may be transmitted to a geographic information system (GIS) server, such as an ArcGIS server, as a non-limiting example ("ArcGIS" is a trademark of the Environmental Systems Research Institute (Esri) of Redlands, California).

In a particular example, the remote computing device 110 is configured to receive the location information and to assign sensor operations to the plurality of portable field devices 150 based on the location information. In one example, the remote computing device 110 is configured to identify, for each sensor operation, a portable field device of the plurality of portable field devices 150 that is nearer to a location associated with the sensor operation as compared to the other portable field devices of the plurality of portable field devices 150. The remote computing device 110 may be configured to assign the sensor operation to the portable field device that is nearer to the location as compared to the other portable field devices of the plurality of portable field devices 150.

To further illustrate, in some examples, the remote computing device 110 is configured update the structural health management system 118 based on a sensor operation schedule 122. As an illustrative example, the remote computing device 110 may be configured to determine based on the sensor operation schedule 122 that certain sensor operations are to be performed periodically at a particular structure of the plurality of structures 180, such as by determining based on the sensor operation schedule 122 that a pipeline structure is to be imaged according to a quarterly schedule, as an illustrative example.

The plurality of portable field devices 150 is configured to access the structural health management system 118. In a particular example, each portable field device of the plurality of portable field devices 150 is configured to access the structural health management system 118 via a communication interface, such as the communication interface 154 and the communication interface 164. To further illustrate, in some examples, the portable field device 152 is configured to access the structural health management system 118 to determine that an imaging operation of the structure 182 is assigned to the portable field device 152. As another example, the portable field device 162 may be configured to access the structural health management system 118 to determine that an imaging operation of the structure 184 is assigned to the portable field device 162.

In some examples, the plurality of portable field devices 150 is configured to access the structural health management system 118 via a push notification operation, where data of the structural health management system 118 is pushed to the plurality of portable field devices 150 (e.g., using the communication network 138). In another example, the plurality of portable field devices 150 is configured to access the structural health management system 118 via a pull notification operation, where data of the structural health management system 118 is requested by and sent to the plurality of portable field devices 150 (e.g., using the communication network 138).

To further illustrate, in the example of FIG. 1A, the remote computing device 110 is configured to send a plurality of notifications 121 to the plurality of portable field devices 150 (e.g., via the communication network 138). Depending on the particular implementation, the plurality of notifications 121 may be sent via a push notification operation, a pull notification operation, one or more other notification operations, or a combination thereof.

The plurality of notifications 121 is configured to cause a one or more of the GUIs of the plurality of portable field devices 150 to indicate the plurality of sensor operations. For example, a first notification of the plurality of notifications 121 may be configured to cause the GUI 158 to indicate one or more sensor operations, such as a first sensor operation and a second sensor operation, as illustrative examples. As another example, a second notification of the plurality of notifications 121 may be configured to cause the GUI 168 to indicate one or more other sensor operations, such as a third sensor operation, a fourth sensor operation, and a fifth sensor operation, as illustrative examples.

The plurality of portable field devices 150 may be configured to display information indicating the plurality of sensor operations in response to the plurality of notifications 121. In some examples, one or more of the plurality of portable field devices 150 are configured to display information to a technician to initiate a sensor operation using a tool of the plurality of tools 170. In another example, one or more of the plurality of portable field devices 150 correspond to robots or autonomous vehicles that are configured to autonomously perform a sensor operation using a tool of the plurality of tools 170. In another example, information from the field is fed back to the server for remote analysis by an engineer, technician, American Petroleum Institute (API) inspector ("American Petroleum Institute" and "API" are trademarks of API of Washington, DC), or an NDE coordinator, etc.

The plurality of tools 170 is configured to generate a plurality of results of the plurality of sensor operations. In the example of FIG. 1A, the plurality of results includes a result 142 of the sensor operation performed on the structure 182 and further includes a result 144 of the sensor operation performed on the structure 184.

To further illustrate, in a particular example, the portable field device 152 is configured to initiate a particular sensor operation to image the structure 182 using the tool 172. In one example, the particular sensor operation includes an ultrasonic imaging operation of the structure 182, the tool 172 includes an ultrasonic transceiver device, and the result 142 includes an ultrasonic image. Alternatively or in addition, the particular sensor operation may include a radiographic imaging operation of the structure 182, the tool 172 may include a radiographic generator and detector device, and the result 142 may include a radiographic image. Alternatively or in addition, the particular sensor operation may include a visual imaging operation of the structure 182, the tool 172 may include a camera, and the result 142 may include an image. Alternatively or in addition, one or more other sensor operations may be performed.

The plurality of portable field devices 150 may be configured to receive the results of the plurality of sensor operations. For example, in some implementations, the plurality of tools 170 is configured to provide the results of the plurality of sensor operations to the plurality of portable field devices 150 via communication interfaces of the plurality of portable field devices 150, such as the communication interface 154 and the communication interface 164. Depending on the particular implementation, the communication interfaces may include wireless connections or wired connections, such as universal serial bus (USB) connections, Wi-Fi connections, or Bluetooth connections (Bluetooth is a trademark of the Bluetooth Special Interest Group (SIG) of Kirkland, Washington), as illustrative examples.

The plurality of portable field devices 150 is configured to send, to the remote computing device 110, second data 140 that indicates the results of the plurality of sensor operations. For example, in FIG. 1A, the second data 140 includes the result 142 and the result 144. The second data 140 may include acoustic emission data, vibration data, ultrasound measurements, radiographic measurements, data generated using an automated robotic testing device, magnetic flux leakage (IVIFL) data, CIVIL data, TML, data, or other data, as illustrative examples. Alternatively or in addition, the second data 140 may include information related to inspection, testing, or verification of items of a visual inspection checklist (e.g., insulation, structural supports, or external corrosion, etc.). Alternatively or in addition, the second data 140 may include results of a weld inspection, such as NDE results, such as magnetic testing results, dye penetrant testing results, positive material identification results, Brinell hardness testing results, ferrite testing results, copper sulfate testing results, weld-quality radiographic testing results, or weld-quality ultrasonic testing results, as illustrative examples.

In some implementations, the plurality of portable field devices 150 is configured to send the second data 140 to the remote computing device 110 using the communication network 138. In some examples, the second data 140 is encrypted using an encryption key prior to transmission to the remote computing device 110 via the communication network 138. Alternatively or in addition, the second data 140 may be modulated and encoded according to a modulation and encoding scheme (MCS) prior to transmission to the remote computing device 110 via the communication network 138.

The remote computing device 110 is configured to receive the second data 140 from the plurality of portable field devices 150. In some examples, the remote computing device 110 is configured to demodulate, decode, and decrypt the second data 140 upon receiving the second data 140 from the plurality of portable field devices 150. In some examples, the remote computing device 110 is configured to store the second data 140 to the memory 114, and the one or more processors 112 are configured to execute the instructions 116 to retrieve the second data 140 from the memory 114.

The remote computing device 110 is configured to perform a plurality of remote structural health monitoring operations based on the second data 140 to determine one or more structural health characteristics of each structure of the plurality of structures 180. To illustrate, a particular sensor operation of the plurality of sensor operations may include a thickness monitoring operation or a condition monitoring operation, and performing at least one remote structural health monitoring operation of the plurality of structural health monitoring operations may include determining a thickness or a type of condition (e.g., acceptable, aged, or out-of-spec, etc.) of a particular structure. In this example, the one or more structural health characteristics may include a thickness or a type of condition of the particular structure. Alternatively or in addition, the plurality of sensor operations may include an acoustic emission sensing operation, a vibration sensing operation, a sensing operation performed using an automated robotic testing device, a MFL sensing operation (e.g., using a pipeline sensor), a drone imaging operation, one or more operations to generate information for one or more data analytics operations, one or more other operations, or a combination thereof, as non-limiting examples.

In some examples, the remote computing device 110 is configured to perform a remote structural health monitoring operation by evaluating the results indicated by the second data 140 and by determining, based on the results, whether to accept one or more of the plurality of sensor operations, to reject one or more of the plurality of sensor operations, or to initiate one or more additional operations for one or more of the plurality of sensor operations.

In the example of FIG. 1A, the remote computing device 110 is configured to generate a signal 124 and to send the signal 124 (e.g., via the communication network 138) to one or more of the plurality of portable field devices 150. In some examples, the signal 124 enables the remote computing device 110 to remotely initiate one or more additional operations associated with a particular sensor operation, to remotely initiate one or more additional operations associated with a particular tool, or a combination thereof.

To illustrate, in some examples, a result of a particular sensor operation may indicate that a structure of the plurality of structures 180 is within a tolerance range 126, such as a "normal" tolerance range. In this example, performing a structural health monitoring operation may include indicating to a portable field device acceptance of the result (e.g., via a particular opcode specified by the signal 124) and may further include updating the structural health management system 118 to indicate a particular status (e.g., a complete status) of the particular sensor operation.

In some examples, the signal 124 causes a particular portable field device to transition a mode of operation of a tool. To illustrate, if the remote computing device 110 accepts the result 142, the signal 124 may indicate that the portable field device 152 is to transition a mode of operation of the tool 172. In this example, the portable field device 152 is configured to transition the mode of operation of the tool 172 in response to the signal 124. The mode of operation may include a duty cycle of the tool 172 or a power on/off mode of the tool 172, as an illustrative example. In this case, transitioning the mode of operation of the tool 172 may reduce power consumption of the tool 172 (e.g., by enabling transitioning of the tool 172 to a reduced duty cycle or to a power-off state, as illustrative examples).

In another example, performing a remote structural health monitoring operation may include initiating a repeat of a particular sensor operation. To illustrate, in one example, the result 142 may be near a border value of the tolerance range 126 (e.g., where the result 142 is outside of the tolerance range 126 and is within a threshold range of a border value of the tolerance range 126). In this example, the remote computing device 110 may instruct the portable field device 152, via the signal 124, to repeat the particular sensor operation to obtain another result 142.

In another example, performing a remote structural health monitoring operation may include detecting a fault condition based on a particular result received from a portable field device. For example, in some cases, the result 142 may indicate a fault condition associated with the tool 172 or the structure 182.

To further illustrate, in some examples, the fault condition corresponds to miscalibration of the tool 172. The remote computing device 110 may be configured to determine a calibration status 127 of the tool 172 based on whether the result 142 satisfies a measurement threshold (e.g., based on whether the result 142 deviates from the tolerance range 126 by at least a threshold amount). For example, in response to the result 142 satisfying the measurement threshold, the calibration status 127 of the tool 172 may have a first value indicating that the tool 172 is calibrated correctly. Alternatively, in response to the result 142 failing to satisfy the measurement threshold, the calibration status 127 of the tool 172 may have a second value indicating that the tool 172 is calibrated incorrectly.

The remote computing device 110 may be configured to determine, based on whether the calibration status 127 has the first value or the second value, whether to request recalibration of the tool 172. In response to the calibration status 127 having the second value, the signal 124 may initiate recalibration of the tool 172. The portable field device 152 may recalibrate the tool 172 and may repeat the sensor operation using the recalibrated tool 172 to generate a recalibrated result 176. The remote computing device 110 may receive the recalibrated result 176 from the portable field device 152 after recalibration of the tool 172.

In a particular example, the remote computing device 110 is configured to update the structural health management system 118 to indicate the recalibration of the tool 172. In some examples, the recalibrated result 176 indicates a timestamp associated with recalibration of the tool 172, and the remote computing device 110 is configured to update the structural health management system 118 to indicate the timestamp, to indicate an operator of the tool 172, or to indicate a qualification or certification of the operator of the tool 172, as non-limiting examples.

Alternatively or in addition, the remote computing device 110 may be configured to determine the calibration status 127 of a tool based on a usage history of the tool. For example, the remote computing device 110 may be configured to track a count of operations performed by the tool 172 since a previous recalibration of the tool 172. In response to the count of operations satisfying a threshold (e.g., exceeding the threshold), the remote computing device 110 may be configured to assign the second value to the calibration status 127 and to initiate recalibration of the tool 172 based on the second value of the calibration status 127. Alternatively or in addition, recalibration of the tool 172 may be initiated based on a time interval (e.g., by initiating recalibration of the tool 172 after each two hours of use in the field, as a non-limiting example). Alternatively or in addition, recalibration of the tool 172 may be initiated upon the beginning of a shift of an operator of the tool 172, upon the end of the shift of the operator of the tool 172, upon a change of material, upon a change in pipe schedule (e.g., where a minimum wall thickness or a maximum wall thickness changes with a pipe schedule and thus involves differently sized calibration blocks), upon one or more other conditions, or a combination thereof, as non-limiting examples.

To further illustrate, in some implementations, the remote computing device 110 includes a calibration counter 130. In some examples, the structural health management system 118 includes or is coupled to the calibration counter 130. Depending on the particular implementation, the calibration counter 130 may include one or more hardware devices, instructions executable by the one or more processors 112, or a combination thereof. The calibration counter 130 may be configured to store a value 132 associated with calibration of a tool, such as the tool 172. In one example, the calibration counter 130 is configured to count indications of a time interval since a previous calibration of the tool 172, such as by counting a number of seconds, minutes, hours, days, or clock cycles since the previous calibration of the tool 172. The value 132 may indicate the time interval since the previous calibration of the tool 172.

The structural health management system 118 may be configured to query the calibration counter 130 (e.g., in response to receiving the result 142, or in response to one or more other events) to identify the value 132 and may be configured to compare the value 132 to a threshold value. In one example, the structural health management system 118 is configured to assign a first value to the calibration status 127 in response to determining that the value 132 fails to satisfy (e.g., is less than, or is less than or equal to) the threshold value. In response to determining that the value 132 satisfies (e.g., exceeds) the threshold value, the structural health management system 118 may be configured to assign the second value to the calibration status 127 and to initiate recalibration of the tool 172 (e.g., via a particular opcode of the signal 124). After recalibration of the tool 172, the structural health management system 118 may reset the value 132 of the calibration counter 130 and may assign the first value to the calibration status 127.

In some cases, remotely tracking calibration of one or more tools of the plurality of tools 170 by the remote computing device 110 (e.g., using the calibration counter 130) may improve system performance. For example, remotely tracking calibration of the tool 172 may reduce an amount of calibration data stored at the tool 172, the portable field device 152, or both. As a result, usage of memory and processing resources may be reduced at the portable field device 152, the tool 172, or both, which may improve battery life in some implementations. Further, each occurrence of recalibration of a tool of the plurality of tools 170 may be tracked by the remote computing device 110 (e.g., by storing a calibration history for each tool of the plurality of tools 170), which may improve certain operations, such as an operation to verify a particular measurement (e.g., an anomalous measurement). In some cases, instead of initiating a new sensor operation to repeat the anomalous measurement, the calibration history for particular tool may be retrieved and parsed (e.g., to identify one or more instances of recalibration of the particular tool, to identify one or more relevant hardware serial numbers, or to identify one or more vendor annual calibrations, as non-limiting examples).

In some examples, performing a particular remote structural health monitoring operation includes detecting a defect in a structure based on the second data 140. To illustrate, in some examples, the result 142 may indicate a crack, leak, fracture, or other defect of the structure 182. In some examples, the signal 124 indicates a service request 128 to service the structure 182 (e.g., by repairing the crack, leak, fracture, or other defect of the structure 182). The remote computing device 110 may update the structural health management system 118 to indicate that a defect has been identified with respect to the structure 182 and that the service request 128 has been issued with respect to the structure 182.

In some examples, the signal 124 indicates to adjust one or more parameters 129 of a particular sensor operation and to repeat the particular sensor operation using the adjusted one or more parameters 129. As a particular illustrative example, the one or more parameters 129 may include of a resolution (e.g., sample rate) of the tool 172. The remote computing device 110 may be configured to receive one or more results generated using the adjusted one or more parameters 129.

In some implementations, a remote structural health monitoring operation is performed in real time or near-real time during a particular sensor operation. For example, although FIG. 1A depicts a single result 142, in some examples, multiple results 142 can be sent to the remote computing device 110 over a particular time period. For example, each result 142 can include data of a data stream (e.g., a stream of images) that is provided serially by the portable field device 152 to the remote computing device 110 via the communication network 138. As each image is received by the remote computing device 110, the remote computing device 110 may provide the signal 124 to the portable field device 152 (e.g., to indicate that one or more images are to be captured, to indicate that the sensor operation is to be terminated, or to indicate that the one or more parameters 129 are to be adjusted).

Further, in some implementations, a remote structural health monitoring operation is performed, controlled, or viewed by one or more other devices in addition to the remote computing device 110. As an example, a remote structural health monitoring operation may be performed according to a "multi-party review" process that includes input from multiple remote computing devices 110. As another example, in some cases, data of the remote structural health monitoring operation is displayed at a remote display in real time or near-real time, such as at the display 134, at a display coupled to the IDMS server 102, at another display, or a combination thereof.

The remote computing device 110 may be configured to maintain historical data 125 associated with sensor operations. The historical data 125 may be maintained on a per-structure basis, on a per-tool basis, or on another basis. To illustrate, the historical data 125 may indicate, based on prior results of sensor operations at the structure 182, a signature associated with sensor operations performed at the structure 182. The remote computing device 110 may be configured to compare the result 142 to a signature indicated by the historical data 125. In some examples, the remote computing device 110 is configured to accept the result 142 in response to determining that the result 142 is within a threshold range of the signature and to reject the result 142 in response to determining that the result 142 is outside a threshold range of the signature.

In some examples, the remote computing device 110 is configured to group sensor operations into projects 123. To illustrate, FIG. 1B depicts certain illustrative aspects associated with particular examples of the projects 123.

Figure 1B:
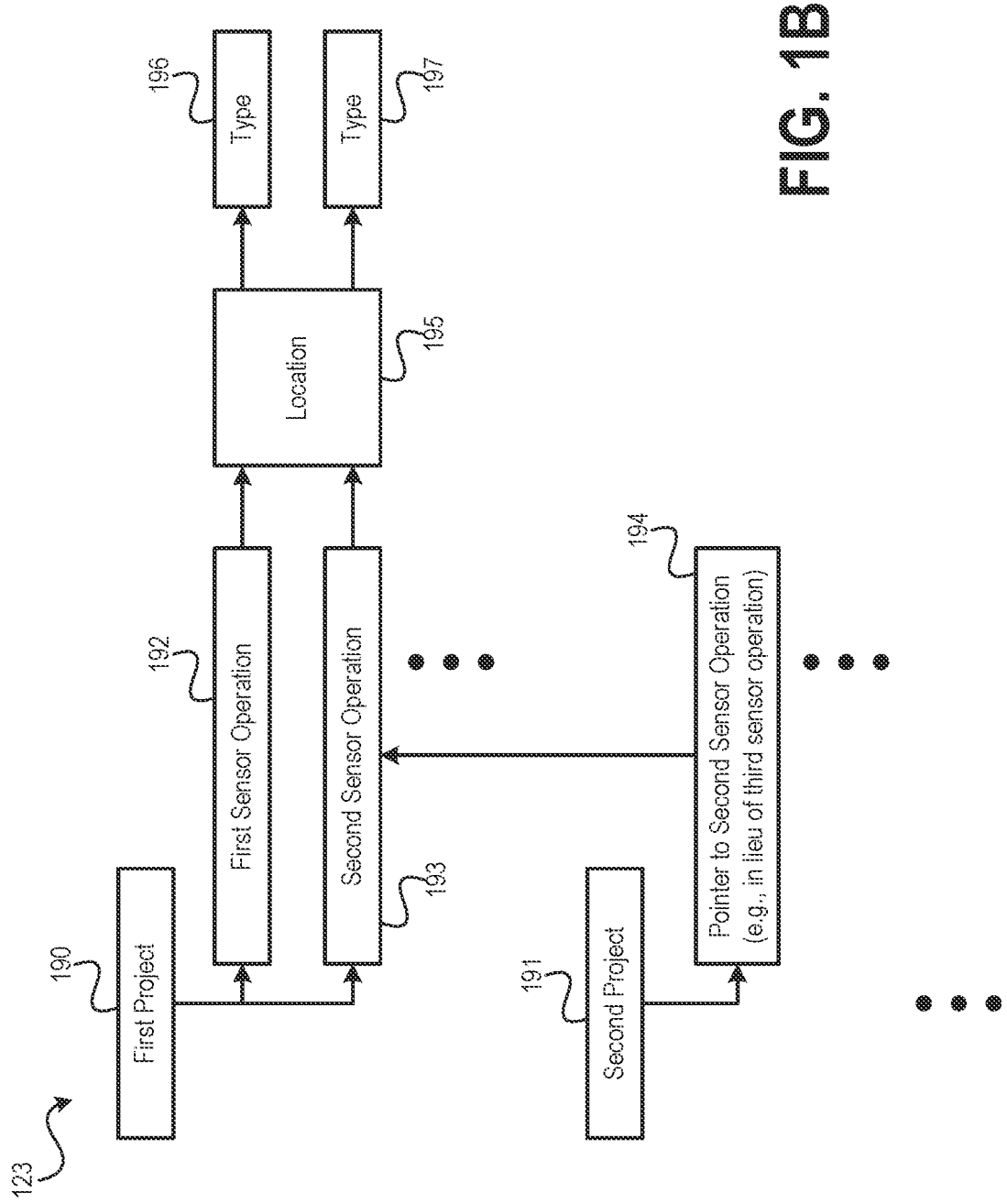
FIG. 1B is a diagram illustrating a particular illustrative example of sensor operation scheduling that may be performed by the remote computing device of FIG. 1A in accordance with aspects of the disclosure.

In the illustrative example of FIG. 1B, the projects 123 include a first project 190 and a second project 191. The first project 190 may be associated with a first sensor operation 192 and a second sensor operation 193. In one example, the first sensor operation 192 includes imaging of the structure 182, and the second sensor operation 193 includes imaging of the structure 184. In another example, the first sensor operation 192 includes imaging of a first particular portion of the structure 182, and the second sensor operation 193 includes imaging of another particular portion of the structure 182. In some examples, each project of the projects 123 includes a grouping of similar sensor operations, such as sensor operations performed at a common site.

Each project of the projects 123 may indicate a set of sensor operations and one or more identifiers associated with the set of sensor operations, such as a location identifier of each sensor operation or a type identifier associated with each sensor operation. To illustrate, the first sensor operation 192 and the second sensor operation 193 are associated with a location identifier 195 (e.g., an indication of a location of the structure 182, as an illustrative example). As additional examples, the first sensor operation 192 is associated with a type identifier 196 (e.g., an indication of an ultrasonic sensor operation, as an illustrative example), and the second sensor operation 193 is associated with a type identifier 197 (e.g., an indication of a radiographic sensor operation, as an illustrative example).

In some examples, grouping of sensor operations into the projects 123 by the structural health management system 118 enables the system 100 to reduce or avoid duplication of sensor operations. For example, before updating the structural health management system 118 to add an indication of a sensor operation associated with the structure 182, the remote computing device 110 may query the structural health management system 118 to determine whether one or more existing projects of the projects 123 include an indication associated with the sensor operation.

To further illustrate, in a particular example, upon determining based on the first data 104 that a particular type of sensor operation is to be performed at a particular location, the remote computing device 110 may query the structural health management system 118 to determine whether one or more existing projects of the projects 123 include an indication associated with the particular sensor operation. For example, the remote device may search the structural health management system 118 to identify one or both of a location identifier or a type identifier associated with the particular sensor operation.

In response to determining that a particular project of the projects 123 includes the indication associated with the sensor operation, the remote computing device 110 may update the structural health management system 118 by linking the sensor operation to the particular project (e.g., instead of opening a new project for the sensor operation). Alternatively, in response to failing to identify a particular project that includes the indication associated with the sensor operation, the remote computing device 110 may add the indication to the structural health management system (e.g., by opening a new project for the sensor operation).

In the example of FIG. 1B, the second project 191 includes a pointer 194 that points to the second sensor operation 193. In a particular example, the remote computing device 110 is configured to add the pointer 194 to the second project 191 in response to determining that the second sensor operation 193 matches a third sensor operation associated with the second project 191. For example, the location identifier 195 may match a location associated with the third sensor operation, and the type identifier 197 may match a sensor type associated with the third sensor operation. In this case, the remote computing device 110 may add the pointer 194 to the second project 191 (e.g., instead of adding a new third sensor operation to the second project 191). As a result, the structural health management system 118 may reduce or avoid duplication of sensor operations.

One or more aspects of FIGS. 1A and 1B improve system performance as compared to conventional structural health monitoring techniques. For example, remote structural health monitoring in accordance with FIGS. 1A and 1B may reduce expenses associated with conveying analysis equipment on-site while also reducing or avoiding the need for multiple visits to the site (e.g., by performing remote structural health monitoring in real time or near-real time). Thus, by using the remote computing device 110 to perform remote structural health monitoring, a structural health monitoring operation in accordance with aspects of the disclosure accrues the benefits of both an off-site analysis technique and an on-site analysis technique.

As another example, performing remote structural health monitoring by the remote computing device 110 may enable real time or near-real time analysis of results, improving system operation and efficiency. For example, the portable field device 152 may send the result 142 to the remote computing device 110 (e.g., via the communication network 138), and the remote computing device 110 may perform analysis of the result 142 while the portable field device is at the location of the sensor operation. In some cases, the remote computing device 110 may prompt the portable field device 152, based on the result 142, to perform a particular operation, such as to repeat the sensor operation or to perform another type of sensor operation. In this example, one or more sensor operations can be performed on an "as needed" basis, reducing the number of unneeded sensor operations. Alternatively or in addition, in another example, the remote computing device 110 may notify the portable field device 152 to recalibrate the tool 172 (e.g., in response to determining that the result 142 is outside the tolerance range 126).

As an additional example, in some cases, remote structural health monitoring by the remote computing device 110 improves system efficiency by facilitating efficient distribution of the sensor operations among projects or by enabling aggregation of results of the sensor operations, as illustrative examples. For example, in some cases, the structural health management system 118 is configured to track the projects 123 to ensure that the same sensor operation (or similar sensor operations) are not duplicated among multiple projects, such as the first project 190 and the second project 191.

Figure 2A:
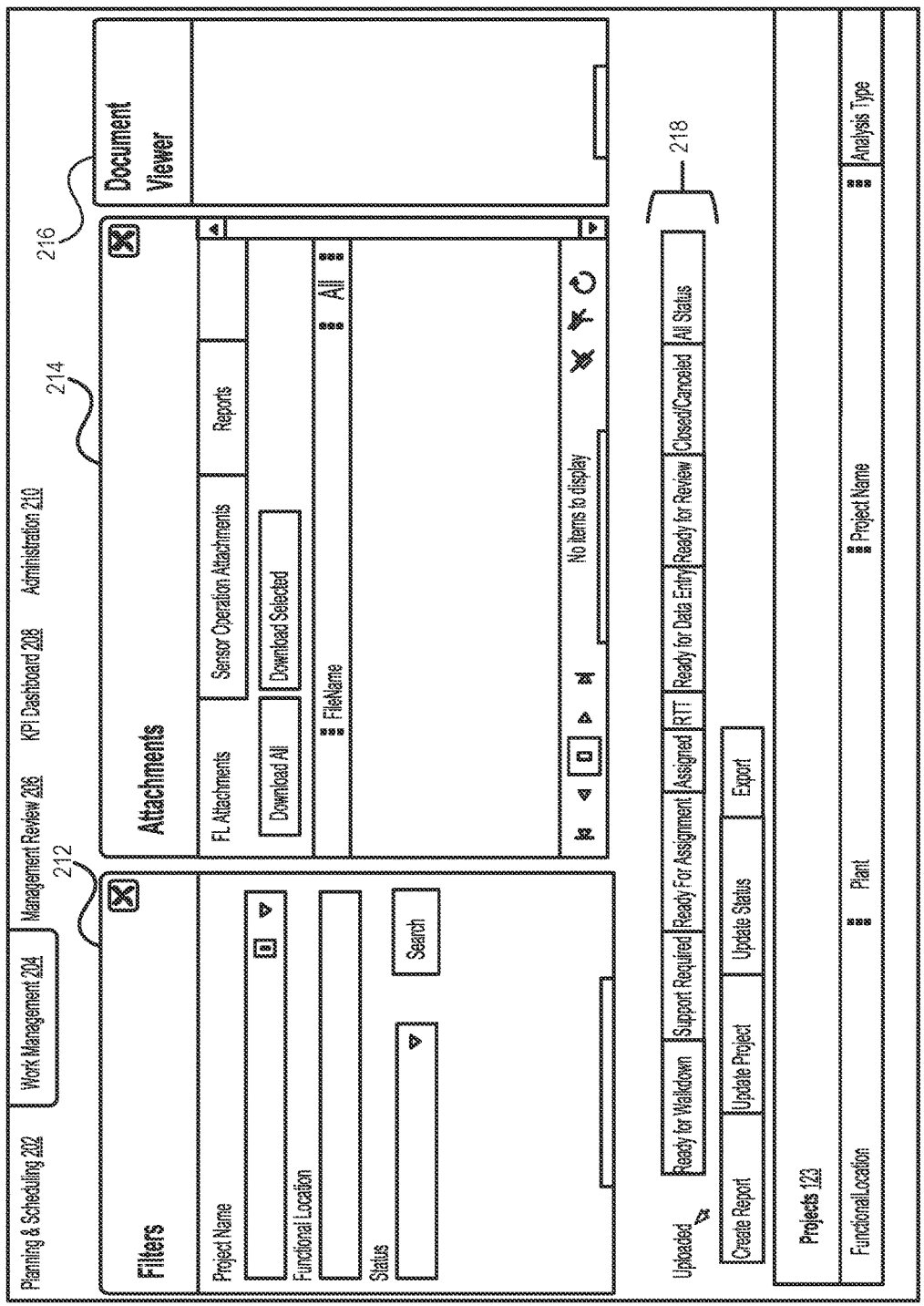
FIG. 2A is a diagram illustrating a particular illustrative example of a graphical user interface (GUI) that may be presented at a display included in or coupled to the remote computing device of FIG. 1A in accordance with aspects of the disclosure.

FIG. 2A depicts certain aspects of a particular illustrative example of the GUI 136 of FIG. 1A. In some implementations, the GUI 136 enables viewing or modification of information of the structural health management system 118 of FIG. 1A. For example, the GUI 136 may be presented upon navigation to a web site that accesses the structural health management sy stem 118.

The GUI 136 includes a planning and scheduling tab 202, a work management tab 204, a management review tab 206, a key performance indicator (KPI) dashboard 208, and an administration tab 210. In other examples, the GUI 136 may include a different number, type, or arrangement of tabs.

The work management tab 204 may include one or more filters 212. The one or more filters 212 may enable a search of the projects 123 based on one or more criteria. For example, in FIG. 2A, the one or more filters 212 enable a search of the projects 123 by project name, by location (e.g., the particular geographic location where one or more sensor operations are to be performed), or by status (e.g., newly requested, currently assigned in the field, completed, reviewed, rejected, or closed, etc.).

The work management tab 204 may further enable viewing of attachments 214. In some examples, the attachments 214 include documents or other data included in the second data 140 (e.g., as results of sensor operations, such as photos captured using an imaging operation). In some examples, the attachments 214 can be viewed using a document viewer 216. The attachments 214 may include one or more attachments associated with a geographic location of a sensor operation (also referred to herein as a functional location (FL)), one or more operations associated with a sensor operation, or a report related to a sensor operation, as illustrative examples. As used herein, a particular FL (or geographic location) may be associated with one sensor operation or multiple sensor operations. As non-limiting examples, an FL may refer to the location of a structure (e.g., a heat exchanger, a pressure vessel, or piping, etc.). The FL may be associated with one or more sensor operations (e.g., CMLs or TMLs), and a visual inspection may be performed on multiple structures at the FL (e.g., the head of a heat exchange, shell tubes, nozzles, or a skirt, etc.).

The work management tab 204 further includes a list 218 of the projects 123. In the list 218, each project of the projects 123 is associated with one or more locations each having one or more sensor operations. To illustrate, the structure 182 may be associated with a first location and one or more sensor operations at the first location, and the structure 184 may be associated with a second location and one or more sensor operations at the second location. In the example of FIG. 2A, the list 218 may indicate, for each sensor operation, the functional location, a plant, a project name, an analysis type, a due date, a type of sensor operation (e.g., a CML, a TML, a weld inspection, or a visual inspection), and a status date.

In FIG. 2A, each sensor operation indicated by the list 218 is associated with a status. To illustrate, sensor operations may have a status of "uploaded" in response to being added to the structural health management system 118. After being uploaded, a sensor operation may have a status of "ready for walk-down." A walk-down may include a preliminary inspection of a site prior to performing a sensor operation.

In some examples, a walk-down may include a preliminary inspection of a site to determine whether support is to be used to reach the site, such as whether a ladder or scaffolding is to be used to reach the site, as illustrative examples. Alternatively or in addition, a walk-down may include determining whether insulation is to be cut or stripped to expose an inspection location (e.g., prior to dispatching a technician or inspector to the site). Depending on the particular example, a walk-down can be performed by a robot or autonomous vehicle or by an inspector or technician.

If during a walk-down a determination is made that support is to be used to reach the site, then a project may have a status of "support required." After support is deployed, a sensor operation may have a status of "ready for assignment." A sensor operation with a status of "ready for assignment" may be ready to be assigned to a particular portable field device of the plurality of portable field devices 150.

In some implementations, the remote computing device 110 of FIG. 1A is configured to assign sensor operations to the plurality of portable field devices 150 using one or more techniques described with reference to FIG. 1A, such as using location information (e.g., GPS coordinates) of the plurality of portable field devices 150, as an illustrative example.

In some cases, the remote computing device 110 of FIG. 1A is configured to delay assignment of a sensor operation if no portable field device is eligible for assignment of the sensor operation. In this case, the sensor operation may have a status of "ready for assignment." As an illustrative example, the remote computing device 110 may be configured to delay assignment of a sensor operation if no portable field device is within a threshold distance of a location associated with the sensor operation. In this case, the sensor operation may have a status of "ready for assignment" until a portable field device is within a threshold distance of the location. Alternatively, in response to identifying a portable field device that is eligible for assignment of the sensor operation, the remote computing device 110 may change the status of the sensor operation to "assigned." As another example, a sensor operation may have a status of "ready for assignment" if a computerized maintenance management system (CMMS), an IDMS (e.g., the IDMS server 102 of FIG. 1A), or a project portfolio management (PPM) system indicates that the sensor operation is not yet due (or is not within a threshold date range of a due date). In this example, the status of the sensor operation may be changed to "assigned" in response to determining that the CMMS, the IDMS, or the PPM system indicates that the sensor operation is due (or is within a threshold date range of a due date).

After assignment, the sensor operations may be performed to generate results, such as the results included in the second data 140 of FIG. 1A. The results may be received at the remote computing device 110 of FIG. 1A. After receiving the results of a sensor operation, the remote computing device 110 may change the status of the sensor operation from "assigned" to another status, such as "ready for interpretation (RTT)," "ready for data entry (completed)," or "ready for review."

In some examples, particular types of results of the second data 140 may involve interpretation. In this case, a sensor operation may generate data that is to be interpreted. As an example, a radiographic sensor operation may generate a radiographic image that is to be interpreted by a laboratory. In this example, the radiographic sensor operation may be assigned a status of "ready for interpretation (RTT)."

In some cases, a sensor operation may have a status of "ready for data entry (completed)" if the sensor operation is completed but a third party has not yet imported results of the sensor operation. For example, a particular sensor operation may have a status of "ready for data entry (completed)" if results of the particular sensor operation are available and have been reviewed but have not been downloaded by the IDMS server 102 of FIG. 1A. It is further noted that one or more aspects of the disclosure may be user-configurable. For example, statuses indicated in FIG. 2A may be independently user-configurable by each third party accessing the GUI 136. In some implementations, the GUI 136 enables independent user configuration of nomenclature of activity statuses, order of activity statuses, thresholds for anomalies, calibration requirements, component diagrams, component orientation terms, report output language, delay reasons, review comments, surface conditions, one or more other features, or a combination thereof, as non-limiting examples.

After data entry is complete, a sensor operation may have a status of "ready for review." In some cases, results of sensor operations can be accessed and reviewed by one or more third parties (e.g., using the GUI 136). For example, in some examples, a third party associated with a structure (e.g., an owner of the structure) is enabled (e.g., via the GUI 136) to access results of a health monitoring operation associated with the structure.

After review, a sensor operation may have a status of "closed/canceled." In the example of FIG. 2A, sensor operations of all statuses can be viewed by selecting "all status."

In some examples, the administration tab 210 includes a tab for approval of new devices. For example, a new portable field device may be added to the plurality of portable field devices 150, and the new portable field device may be activated using the tab for approval of new devices. In a particular illustrative example, an authentication process may be initiated using the tab for approval of new devices to authenticate the new portable field device.

In some examples, the administration tab 210 further includes a tab for tool assignment. The tab for tool assignment may assign tools of the plurality of tools 170 to particular portable field devices of the plurality of portable field devices 150, to particular sensor operations of the plurality of sensor operations, to a particular project of the projects 123, or a combination thereof. To illustrate, in a particular example, the tool 172 includes an ultrasonic sensor device, and the tool 174 includes a radiographic sensor device. If a project of the projects 123 indicates that the structure 182 is to be imaged using both an ultrasonic sensor operation and a radiographic sensor operation, then the tool 172 and the tool 174 may be assigned to the portable field device 152 (e.g., by reassigning the tool 174 from the portable field device 162 to the portable field device 152). In some examples, an ultrasonic sensor device includes a primary tool (e.g., a thickness gauge) and one or more auxiliary tools, such as a calibration block/step wedge, a couplant, and a transducer, as non-limiting examples. In some implementations, a radiographic sensor device is configured to perform a film radiography operation, a computed radiography operation, or a digital radiography operation, as non-limiting examples.

In some examples, the administration tab 210 (or another tab) further includes a tab for deletion or restoration of information. For example, certain attachments may be deleted using a tab for deletion of attachments, such as in response to a determination that two attachments are duplicative (e.g., where the two attachments contain a common set of information). In some examples, a "soft delete" is performed (e.g., by flagging an attachment as being invalid or deleted) instead of a "hard delete" so that the attachment can be subsequently restored.

The GUI 136 may be configured to electronically track and display (e.g., in real time or near-real time) the completion of tasks involving non-destructive or destructive testing, inspection testing, mechanical integrity testing, or repair, such as welding, removal or replacement of insulation, painting, sand blasting, water blasting, power washing, or one or more other tasks, as non-limiting examples. The GUI 136 may enable electronic review, approval, or rejection of inspection results while inspectors and technicians are still in the field, enabling real time re-dispatch of any work assignments that require additional work. For example, the GUI 136 may include a review, rejection, and approval interface to enable rejection of assignments back to the field for re-inspection or to a film room for re-interpretation (e.g., in the case of a radiographic measurement).

Figure 2B:
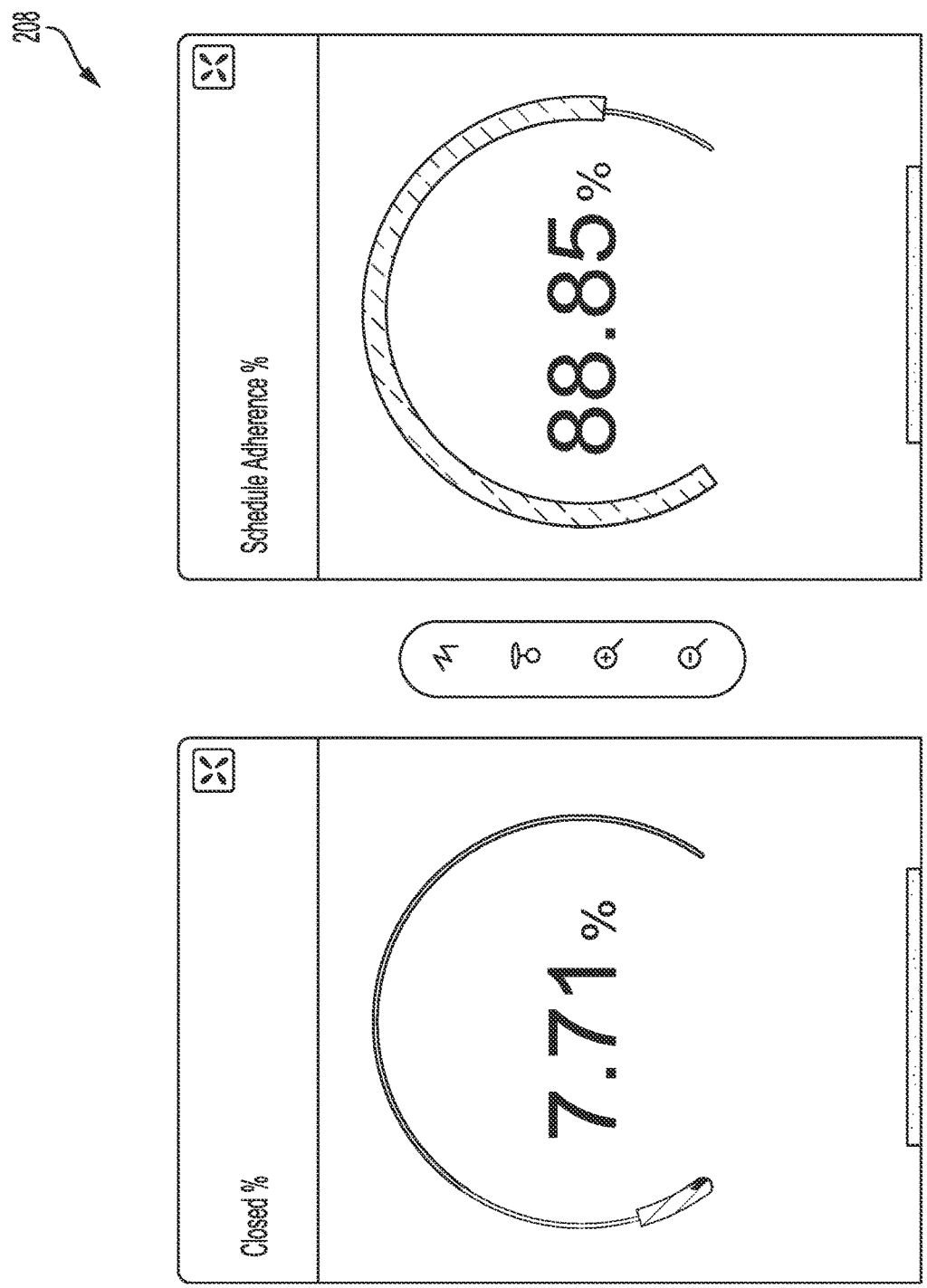
FIGS. 2B, 2C, 2D, 2E, 2F, 2G, and 2H are diagrams illustrating particular illustrative examples of performance data indicated by a key performance indicator (KPI) dashboard that may be displayed using the GUI of FIG. 2A in accordance with aspects of the disclosure.
Figure 2C:
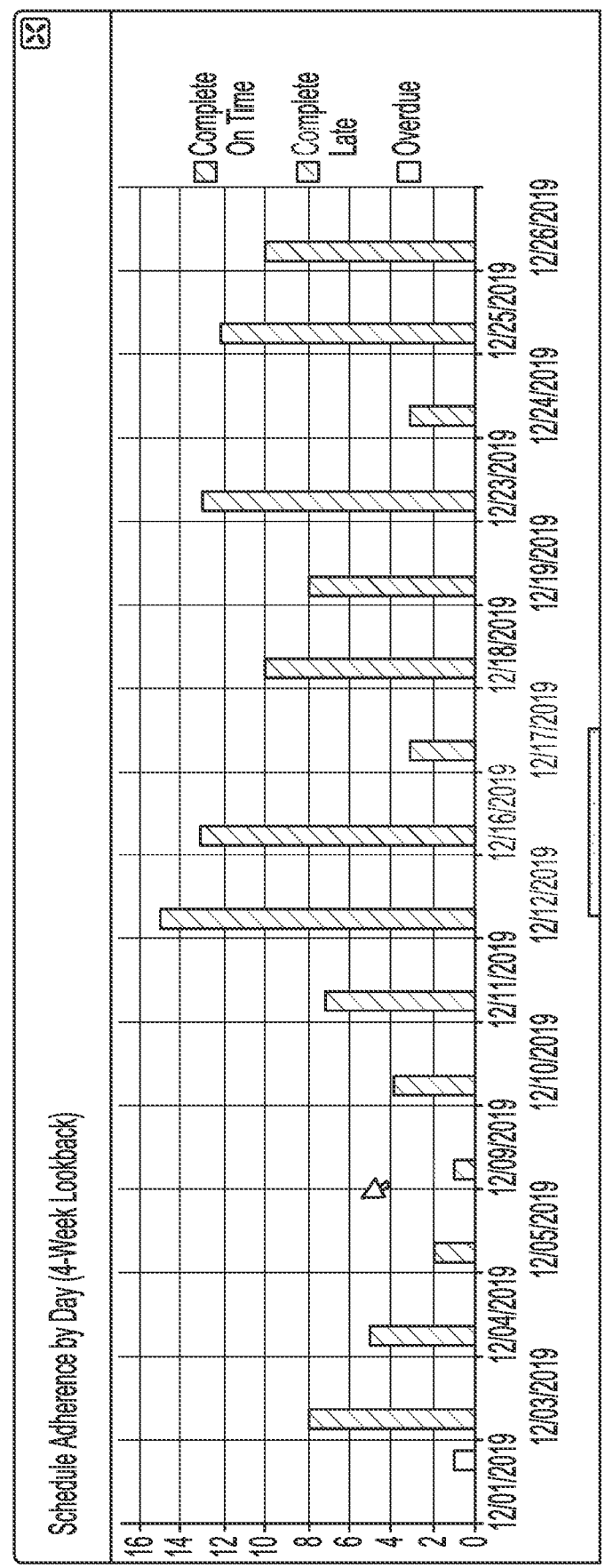

FIGS. 2B-2H illustrate particular examples of performance data that may be indicated by the KPI dashboard 208. In FIG. 2B, the KPI dashboard 208 illustrates a percentage of sensor operations that are closed (e.g., that have a status of "closed/canceled," as described with reference to FIG. 2A). In FIG. 2C, the KPI dashboard 208 further illustrates a schedule adherence percentage (e.g., a percentage of sensor operations that are performed on or before the due date). The KPI dashboard 208 may further depict schedule adherence by day over the preceding four weeks.

Figure 2D:
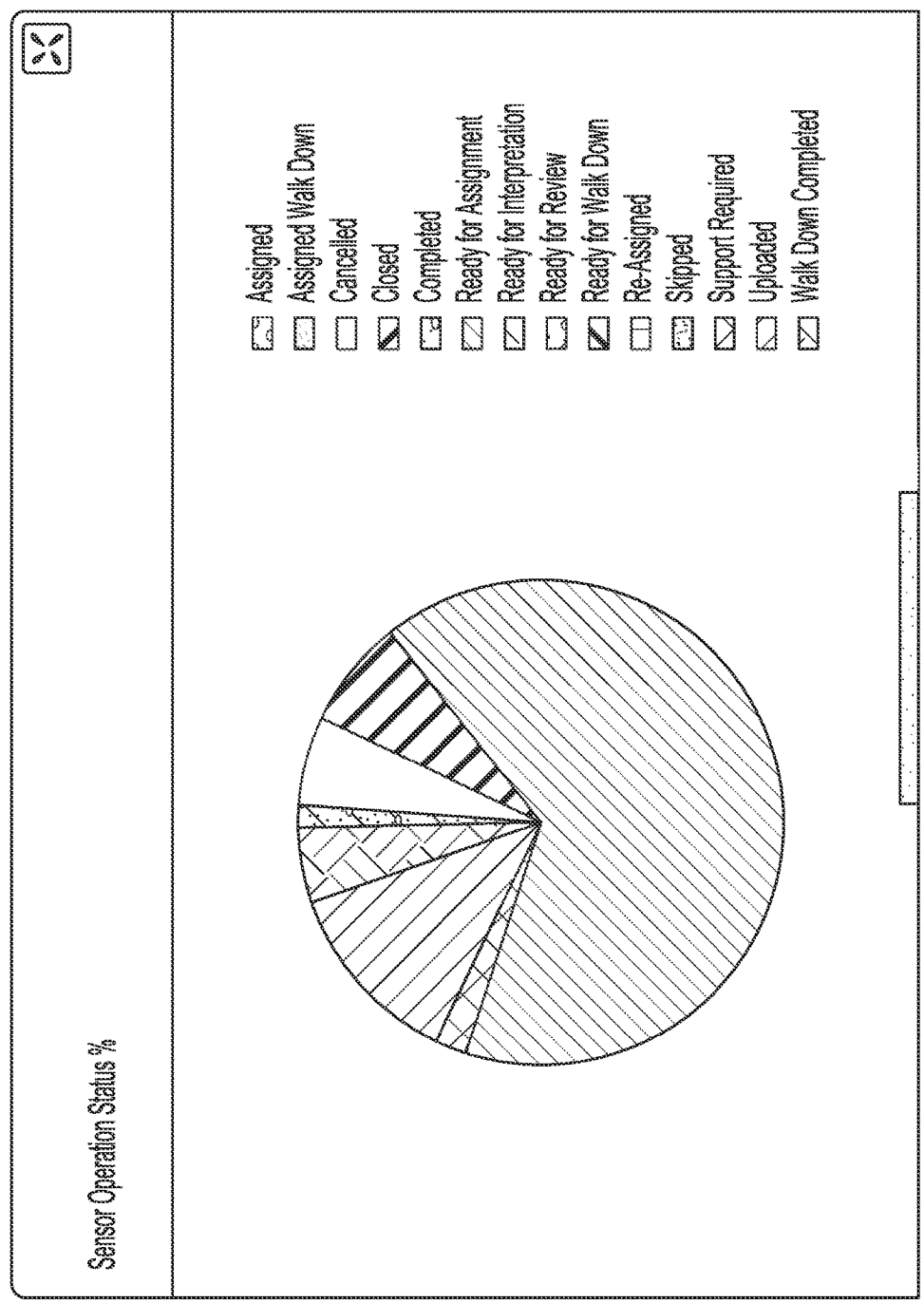
Figure 2E:
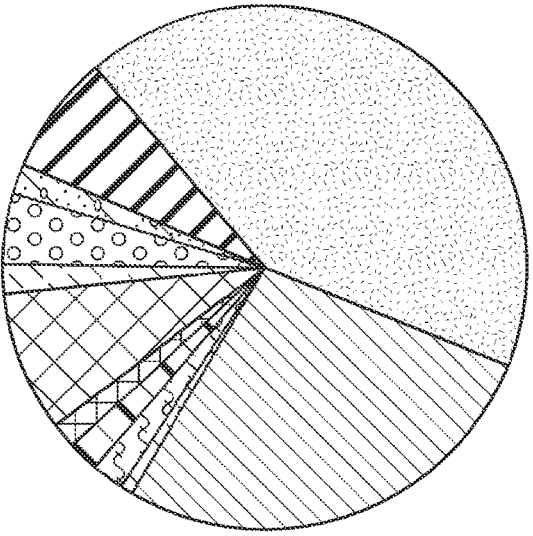
Figure 2F:
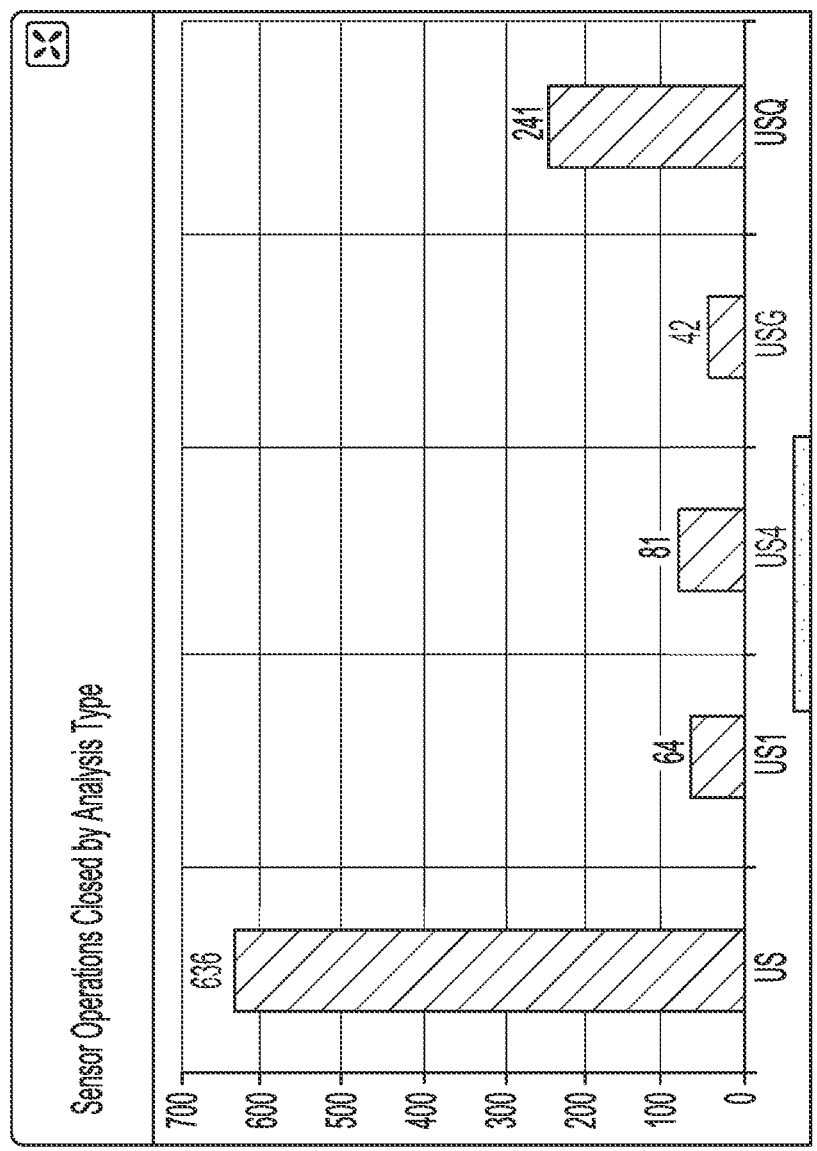
Figure 2G:
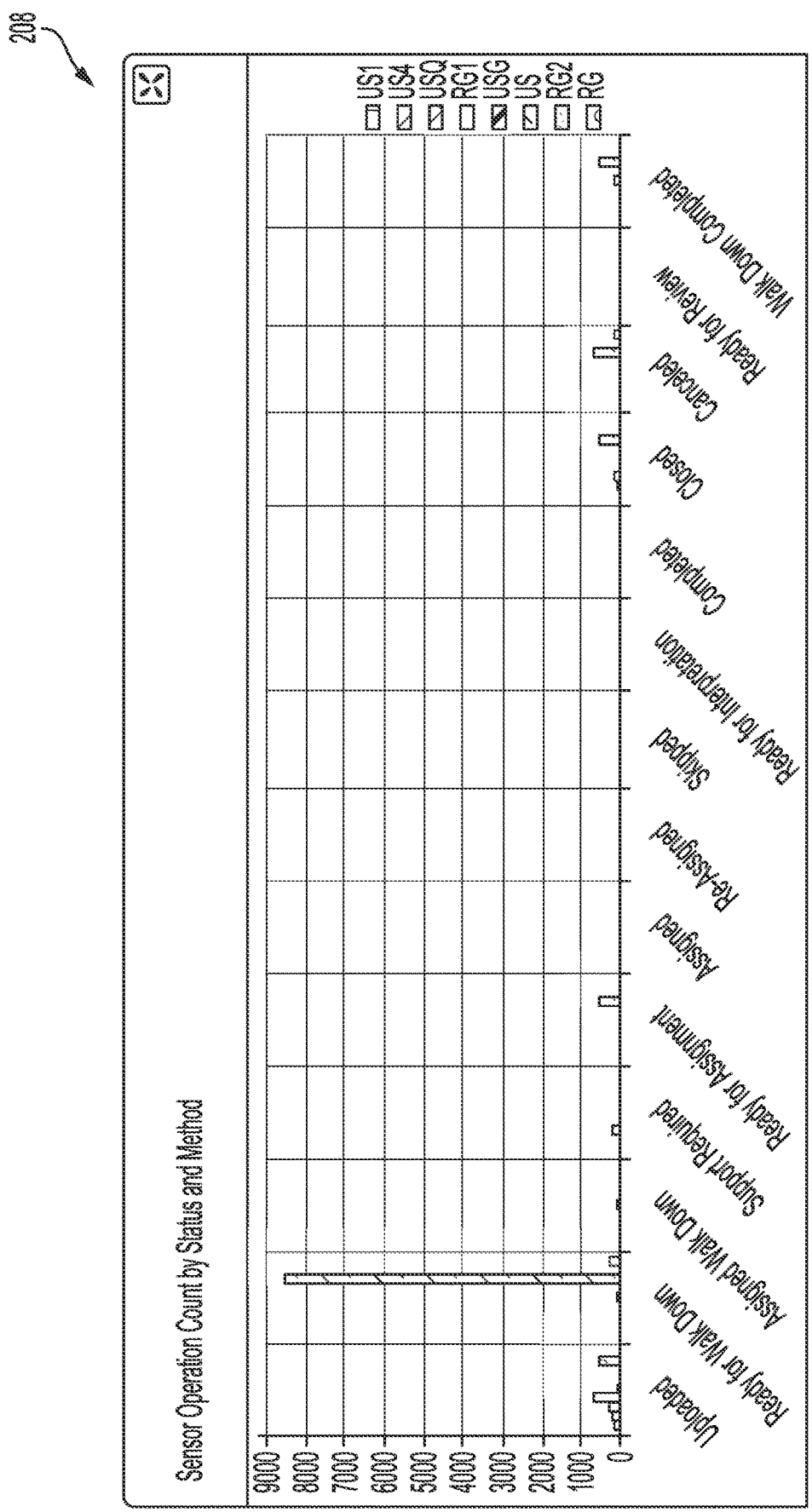
Figure 2H:
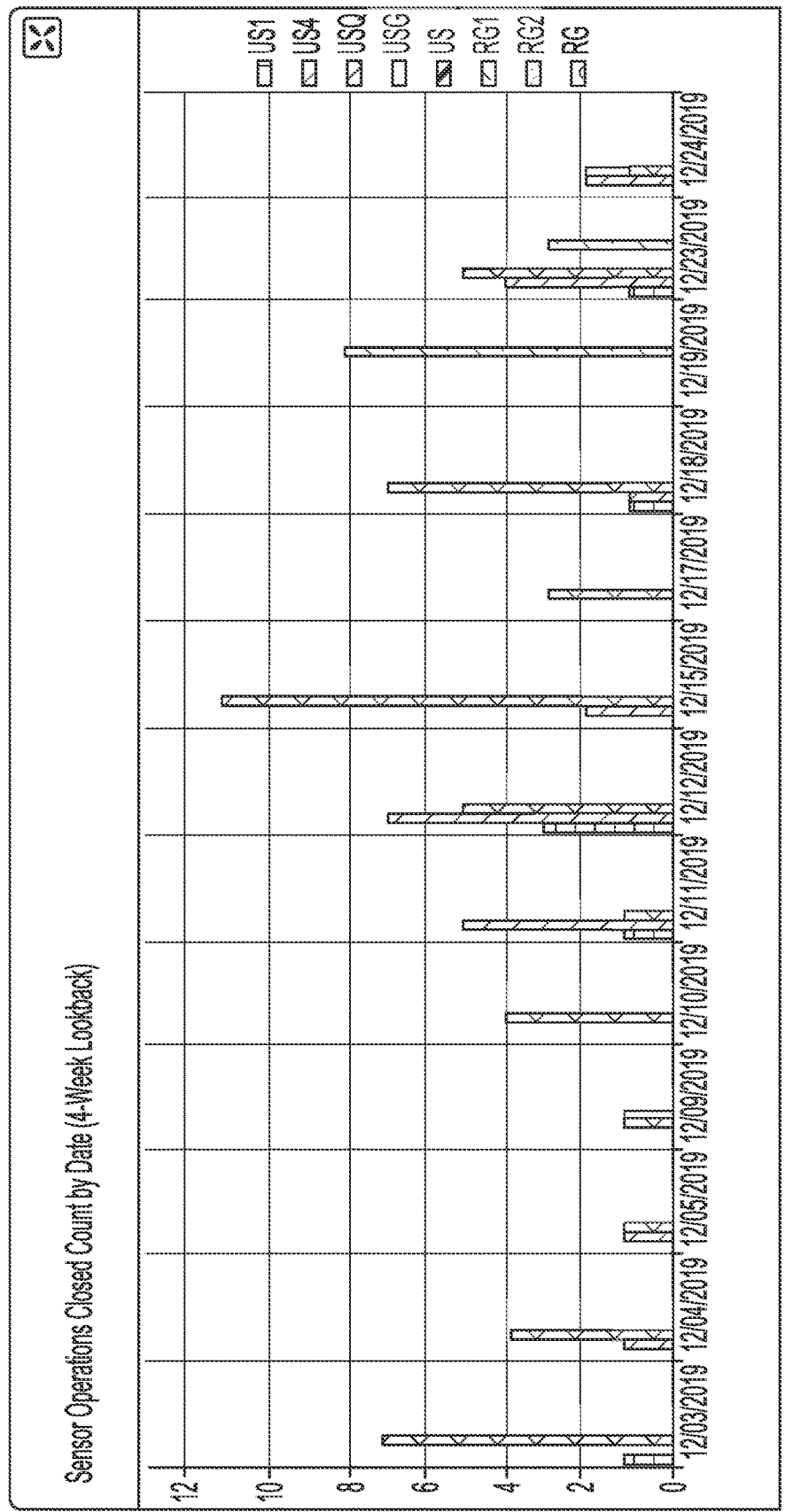

FIG. 2D illustrates that the KPI dashboard 208 may indicate a percentage of sensor operations associated with each status of a plurality of statuses. In FIG. 2E, the KPI dashboard 208 also indicates, for each sensor operation associated with support, a percentage breakdown of each type of support (e.g., scaffolding, cleaning, etc.). The KPI dashboard 208 may further indicate a number of closed sensor operations for each type of sensor operation as in FIG. 2F, a total count of sensor operations by status as in FIG. 2G, and a daily count of closed sensor operations for the preceding four weeks, as in FIG. 2H. It is noted that the particular values and ranges (e.g., as depicted in FIGS. 2F-2H) are provided for illustration. In the non-limiting example of FIG. 2F, each sensor operation may have a type selected from a group of types including an ultrasound type (US), a single point US type (US1), a four-point US type (US4), a grid-based US type (USG), a quadrant-based US type (USQ), a radiography type (RG), a single-view RG type (RG1), a dual-view RG type (RG2), one or more other types, or a combination thereof, as illustrative examples.

In some examples, the remote computing device 110 of FIG. 1A is configured to compare one or more KPIs of the KPI dashboard 208 to one or more performance criteria. As an illustrative example, accuracy of results of sensor operations may be compared to an accuracy threshold. If the accuracy of the results fails to satisfy the accuracy threshold, the remote computing device may generate an alert in some implementations.

It is noted that the examples described with reference to FIGS. 2B-2H are illustrative and that other examples are also within the scope of the disclosure. For example, the KPI dashboard 208 may have a layout or organization that is different than the examples illustrated in FIGS. 2B-2H. The KPI dashboard 208 may graphically represent data using one or more graphs, one or more charts, one or more tables, one or more colors, one or more shapes, or other information that visually represents collected data. Alternatively or in addition, the KPI dashboard 208 may numerically represent data using percentages, averages, sums, functions, or other numerical techniques. The KPI dashboard 208 may indicate one or more types of data, such as productivity data, performance data, cost data, compliance data, facility data, or scheduling data, as illustrative examples. Further, data of the KPI dashboard 208 can be aggregated and displayed using different levels of granularity, such as on a relatively low level (e.g., on a per-technician basis or on a per-structure basis), on a higher level (e.g., on a per-site basis, on a per-facility basis, on a per-project basis, on a per-region basis, or on a per-customer basis), on a "global" level (e.g., on an all-customers-basis or on a worldwide basis), or a combination thereof. Further, data of the KPI dashboard 208 can be aggregated and displayed using multiple levels of granularity, such as by displaying data for a particular customer across multiple regions, by displaying data for a particular region and multiple customers, or by displaying data for multiple customers across multiple regions, as an illustrative example.

One or more aspects of FIGS. 2A-2H may improve system performance as compared to certain conventional techniques. As an example, in some implementations, data analytics operations can be performed based on data of the KPI dashboard 208. As a particular example, a data analytics operation can be performed to determine that infrastructure components within a particular geographic region are subject to an amount of damage that is statistically significant (e.g., due to weather conditions at the particular geographic region). In this case, a report may be generated including a recommendation to repair the damage and to construct weather protection barriers, as illustrative examples.

Figure 3A:
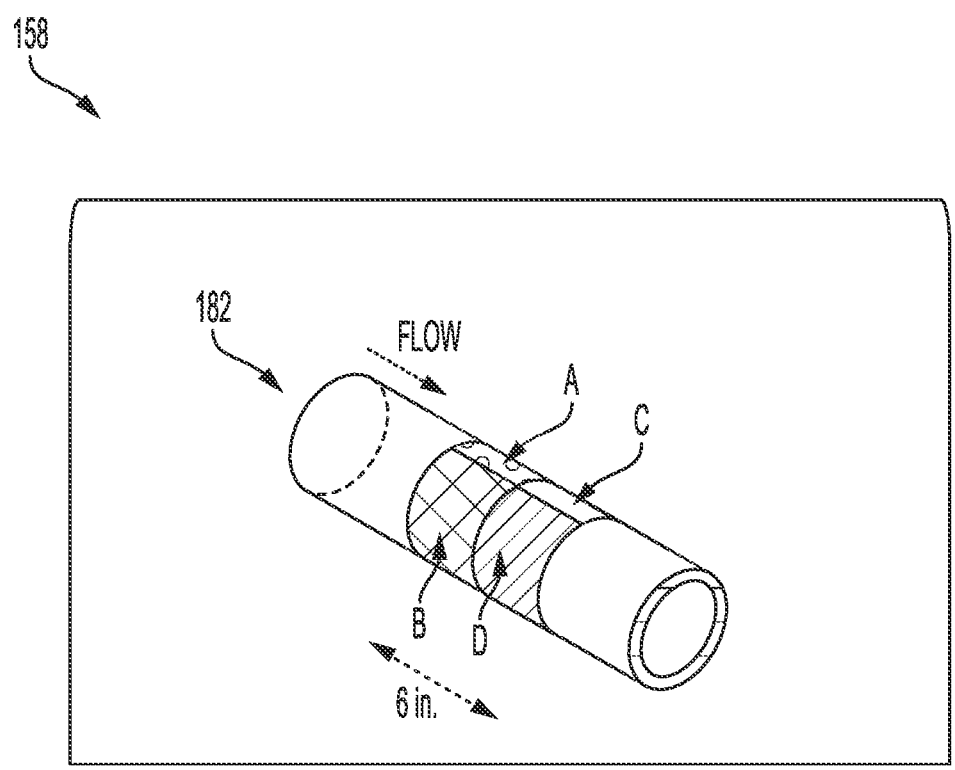
FIG. 3A is a diagram illustrating a particular illustrative example of a GUI that may be presented at one or more of the portable field devices of FIG. 1A in accordance with aspects of the disclosure.

FIG. 3A depicts certain aspects of a particular illustrative example of the GUI 158 of FIG. 1A. In some implementations, one or more aspects of the GUI 158 described with reference to FIG. 2A enable remote viewing or remote modification of data of the structural health management system 118 of FIG. 1A.

The GUI 158 may enable the remote computing device 110 of FIG. 1A to remotely control, initiate, or perform certain operations of a sensor operation. To illustrate, in some examples, the GUI 158 is configured to present drawings, directions, instructions, or other information for manually initiating a sensor operation. As an illustrative example, in some circumstances, certain sensor operations may involve manual positioning of a tool by a technician. In this case, the GUI 158 may be presented at a portable field device to instruct a technician to position a tool for a sensor operation.

To further illustrate, in FIG. 3A, the GUI 158 depicts an illustration of a non-limiting example of the structure 182. In the example of FIG. 3A, the structure 182 includes a straight pipe, such as a straight pipe component of a pipeline, as an illustrative example. In other examples, the structure includes another component of a pipeline (e.g., an elbow pipe or a reducer) or a component of another structure, such as a building or a machine, as illustrative examples.

In FIG. 3A, the GUI 158 depicts certain measurement locations associated with sensor operations to image the structure 182, such as measurement locations A, B, C, and D. In the example of FIG. 3A, the GUI 158 indicates that the measurement locations are within a particular distance of one another, such as six inches (in). Thus, in the example of FIG. 3A, a particular project of the projects 123 of FIG. 1A may include the four sensor operations performed at the measurement locations A, B, C, and D.

The GUI 158 may also indicate an operation type of the sensor operations. In the example of FIG. 3A, the operation type may include a four-point US type (US4) sensing type. The operation type may also indicate a particular opcode (e.g., "001"), which may indicate a sub-type of the operation type in some cases.

Further, in some examples, results generated by a tool can be manually input to a portable field device via the GUI 158. As an illustrative example, a technician may manually input results and notes accompanying the results to a portable field device. In some cases, the notes may provide information not reflected in the results. For example, the notes may include annotations to a photo or image of a structure. In some examples, the notes may indicate weather conditions that may affect reliability of results in some cases. As another example, in some circumstances, a sensor operation may be delayed due to weather, due to difficulty accessing an inspection site, or due to other factors. The GUI 158 may enable input of a type of the delay (e.g., weather) and a duration of the delay. The delay may be indicated in one or more KPIs of the KPI dashboard 208.

FIG. 3B depicts certain additional aspects of a particular illustrative example of the GUI 158. In some implementations, one or more aspects of the GUI 158 described with reference to FIG. 3B enable remote viewing or remote modification of data of the structural health management system 118 of FIG. 1A.

In the example of FIG. 3B, the GUI 158 indicates a plurality of sensor operations including the first sensor operation 192 and the second sensor operation 193. The GUI 158 also indicates certain information associated with the first sensor operation 192 and the second sensor operation 193 in accordance with some aspects of the disclosure. It is noted that the particular examples described with reference to FIG. 3B are illustrative and that other examples are also within the scope of the disclosure.

In FIG. 3B, a functional location (e.g., a location of the structure 182) is associated with each of the plurality of sensor operations. In the example of FIG. 3B, each sensor operation has an analysis type 352, such as an ultrasonic (UT) sensor operation type. Each sensor operation is associated with a specific location number 354, an access type 356 (e.g., scaffolding), a status 358 (e.g., completed or in progress), a component type 360 (e.g., a pipe or an elbow), and a size 362. In FIG. 3B, the GUI 158 further indicates an option 364 to view or update attachments, an option 366 to skip a sensor operation, an option 368 to review and sign for a result of a sensor operation, and an option 370 to record measurements. In some examples, the option 364 enables a user (e.g., a technician or an inspector) to view one or more documents included in the first data 104, such as a text file describing a structure of the plurality of structures 180, a drawing of the structure, a photo of the structure, or specifications associated with the structure, as illustrative examples.

In some examples, the GUI 158 includes a select-all button 372. The select-all button 372 may enable selection of each sensor operation of the plurality of sensor operations indicated by the GUI 158 (e.g., to enable a batch modification, such as to indicate that scaffolding is required by both the first sensor operation 192 and the second sensor operation 193, as an illustrative example).

In some implementations, one or more display aspects of the GUI 158 are user-adjustable. For example, in FIG. 3B, the GUI 158 includes a row-column selection button 374. In some examples, the row-column selection button 374 enables a user (e.g., a technician or inspector) to select whether information of the GUI 158 is presented in a row format or in a column format (e.g., by swapping rows for columns or vice versa). In some circumstances, the row-column selection button 374 may assist the user when access to a structure is limited and the GUI 158 is partially obscured due to the limited access, as an illustrative example.

In FIG. 3B, the GUI 158 further indicates site data 380 associated with a site, such as a location of the structure 182, as an illustrative example. The site data 380 may include a functional location (FL) description, a location status, a last measurement (if any) at the FL, and a due date, as illustrative examples.

In some cases, the GUI 158 may present an alert, such as an alert 376. In the example, of FIG. 3B, the alert 376 indicates that a sensor operation (e.g., a TML) is unassigned. In some cases, the alert 376 may prompt a user (e.g., a technician or an inspector) to request assignment of the sensor operation (e.g., to add the sensor operation to a particular project).

In some examples, the GUI 158 further includes a walk-down interface that enables manual input of information related to a walk-down of an inspection site. For example, for certain sensor operations, a preliminary inspection (also referred to herein as a walk-down) may be performed to determine preliminary information related to the inspection site, such as to determine whether insulation is to be removed from the inspection site or to determine accessibility of the inspection site (e.g., whether a ladder, scaffolding, or a lift is to be deployed).

The GUI 158 may include a reading interface that enables viewing or manual input of results of sensor operations, such as TML readings. The GUI 158 may include a status update interface that enables manual status adjustment of a sensor operation. In some examples, the GUI 158 includes a report creation interface that enables manual creation of reports, such as reports that indicate results of sensor operations. The GUI 158 may further include an assignment interface that enables manual assignment of sensor operations, such as TMLs. The GUI 158 may further include an external inspection interface that enables input of external inspection data, an internal inspection interface that enables input of internal inspection data (e.g., for vessels that have been cleaned, purged, and permitted for entry), or a combination thereof. The GUI 158 may further include a measurements recordation interface that enables recordation of certain measurements, a TML import interface that enables manual import of TMLs (e.g., using a spreadsheet file or a comma-delimited text file, such as a comma-separated values (CSV) file), and a tool assignment interface that enables manual assignment of tools of the plurality of tools 170.

In some examples, the GUI 158 enables real time or near-real time monitoring or control of a sensor operation by the remote computing device 110 of FIG. 1A. For example, in response to sending the result 142 to the remote computing device 110 after a sensor operation, the remote computing device 110 may provide feedback in real time or near-real time to the portable field device 152 via the signal 124 to cause the portable field device 152 to display information indicated by the signal 124. In some cases, the GUI 158 indicates rejection of the result 142 and a reason for the rejection of the result 142.

To illustrate, the signal 124 may include a multi-bit field having a value (e.g., an opcode) that is selectable by the remote computing device 110 to indicate a reason for rejection of the result 142. As a particular example, a first value may indicate that a camera direction is incorrect, a second value may indicate that an image location is incorrect, a third value may indicate that an image is out-of-focus, and a fourth value may indicate that an image is blank or obscured. The GUI 158 may present text describing the reason for rejection and may include a prompt to repeat the sensor operation.

One or more aspects of FIGS. 3A and 3B may improve system performance as compared to certain conventional techniques. For example, the GUI 158 may enable real time or near-real time downloading and uploading of sensor data, measurement results, and other information. As a result, performance may be improved as compared to certain conventional systems that perform off-site downloading and uploading of information.

To further illustrate certain aspects of the disclosure, in some examples, the structural health management system 118 includes a software as a service (SAAS) platform that facilitates one or more of integrity testing, inspection, analysis, evaluation, and asset integrity management and monitoring services related to the structural and mechanical integrity of capital, industrial, and infrastructure assets across all industries in the course of construction, installation, and maintenance of the assets. The SAAS platform may enable the ongoing maintenance of the assets and facilities, which may include maintenance related to insulation, electrical systems, and scaffolding, as illustrative examples.

In some examples, the structural health management system 118 is configured to electronically download relevant asset data, historical inspection data, and drawings directly from IDMS servers (e.g., the IDMS server 102) of asset owners. The structural health management system 118 may be configured to sort and align the data directly to the individual assets to be inspected.

The structural health management system 118 may enable project managers to plan, schedule, and dispatch tasks. The tasks may be displayed as work assignments contained on portable electronic tablet devices (which may be included in the plurality of portable field devices 150) that are used by certified field technicians and inspectors to perform work.

The structural health management system 118 may enable technicians and inspectors to electronically record readings and relevant findings (e.g., the result 142 and the result 144) on the portable electronic tablet devices from non-destructive testing, destructive testing, or other inspection tests. The structural health management system 118 may be configured to compare the test results to predetermined criteria and tolerance levels (e.g., the tolerance range 126, the historical data 125, or both), to identify any test results that exceed specific tolerance levels or deviations, and to initiate equipment re-calibration or a retest if tolerance thresholds are exceeded by the new inspection results. The structural health management system 118 may be configured to electronically generate reports with the new inspection results and upload the inspection results directly to the IDMS servers, such as to the IDMS server 102.

The structural health management system 118 may be configured to electronically track and display (e.g., in real time or near-real time) the completion of tasks involving non-destructive or destructive testing, inspection testing, mechanical integrity testing, or repair, such as welding, removal or replacement of insulation, painting, sand blasting, water blasting, power washing, or other mechanical, electrical, or pipefitting tasks performed on capital, industrial, or infrastructure assets. In some examples, completion time and duration of work is tracked by the structural health management system 118.

The structural health management system 118 may be configured to electronically review, approve, or reject inspection results while inspectors and technicians are still in the field, enabling real time re-dispatch of any work assignments that require verification work. For example, the GUI 136 may include a review, rejection, and approval interface to enable rejection of assignments back to the field for re-inspection or to the film room for re-interpretation (e.g., in the case of a radiographic measurement).

The structural health management system 118 may be configured to electronically calculate key performance indicators or metrics (e.g., information of the KPI dashboard 208) to determine whether tasks performed on capital, industrial, or infrastructure assets meet predetermined performance criteria. The predetermined performance criteria can include accuracy of test results, quality of performance, and time to complete, as illustrative examples.

The structural health management system 118 may be configured to electronically record and report on obstructions or other factors interfering with or delaying completion of tasks performed on capital, industrial, or infrastructure assets. The structural health management system 118 may be configured to electronically notify a technician if test equipment calibration is due based upon usage or other criteria that are reported electronically (e.g., using predetermined parameters regarding an amount of usage of particular test equipment or other relevant criteria). The structural health management system 118 may electronically track qualifications of inspectors or technicians, location or status of tools or equipment, logistics, timekeeping, invoicing, or other features, as illustrative examples.

Figure 4:
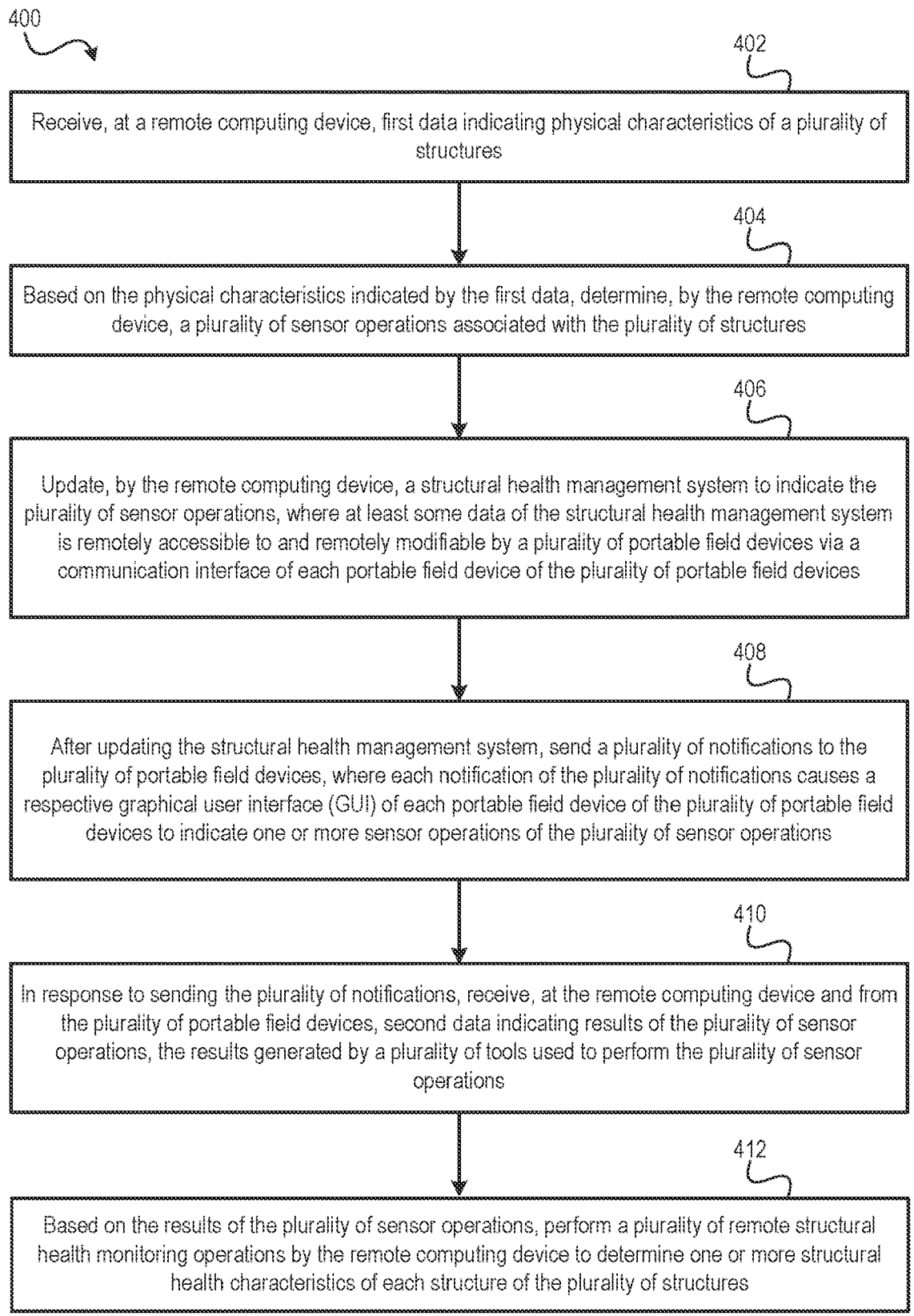
FIG. 4 is a diagram illustrating a particular illustrative example of a method of remote structural health monitoring in accordance with aspects of the disclosure.

Referring to FIG. 4, a block diagram of a particular example of a method of performing remote structural health monitoring is depicted and generally designated 400. In a particular example, operations of the method 400 are performed by a remote computing device that is remotely coupled to a plurality of portable field devices, such as by the remote computing device 110 of FIG. 1A. In a particular example, operations of the method 400 are initiated, performed, or controlled by the one or more processors 112, such as by executing the instructions 116.

The method 400 includes receiving, at a remote computing device, first data indicating physical characteristics of a plurality of structures, at 402. For example, the remote computing device 110 is configured to receive, from the IDMS server 102, the first data 104 indicating the physical characteristics 106 of the plurality of structures 180. In a particular example, the remote computing device 110 is configured to store the first data 104 to the memory 114, and the one or more processors 112 are configured to execute the instructions 116 to retrieve the first data 104 from the memory 114 to identify the physical characteristics 106.

The method 400 further includes determining, based on the first data and by the remote computing device, a plurality of sensor operations associated with the plurality of structures, at 404. For example, the one or more processors 112 are configured to determine, based on the first data 104, a plurality of sensor operations associated with the plurality of structures 180.

The method 400 further includes updating, by the remote computing device, a structural health management system to indicate the plurality of sensor operations, at 406. At least some data of the structural health management system is remotely accessible to and remotely modifiable by a plurality of portable field devices via a communication interface of each portable field device of the plurality of portable field devices. To illustrate, the one or more processors 112 are configured to update the structural health management system 118 to indicate that the plurality of sensor operations are associated with the plurality of structures 180. At least some data of the structural health management system is remotely accessible to and remotely modifiable by the plurality of portable field devices 150 via a communication interface of each portable field device of the plurality of portable field devices (e.g., via the communication interface 154 of the portable field device 152 and via the communication interface 164 of the portable field device 162). To illustrate, in some examples, data of the structural health management system 118 that is remotely accessible to and remotely modifiable by the plurality of portable field devices 150 includes data described with reference to FIGS. 3A and 3B, such as information related to the results of sensor operations. In some examples, other data of the structural health management system 118 is not accessible to or modifiable by the portable field device 162. For example, in some implementations, KPIs of the KPI dashboard 208 are not accessible to or modifiable by the plurality of portable field devices 150. Alternatively or in addition, in some examples, information of the administration tab 210 is not accessible to or modifiable by the plurality of portable field devices 150.

The method 400 further includes, after updating the structural health management system, sending a plurality of notifications to the plurality of portable field devices, at 408. Each notification the plurality of notifications causes a respective GUI of each portable field device of the plurality of portable field devices to indicate one or more sensor operations of the plurality of sensor operations. As a particular example, a first notification of the plurality of notifications 121 may be configured to cause the portable field device 152 to present certain information via the GUI 158 indicating one or more sensor operations of the plurality of sensor operations. As another example, a second notification of the plurality of notifications 121 may be configured to cause the portable field device 162 to present certain information via the GUI 168 indicating one or more other sensor operations of the plurality of sensor operations. The information may include information depicted in the example of FIG. 3A, information depicted in the example of FIG. 3B, other information, or a combination thereof, as illustrative examples.

The method 400 further includes, in response to sending the plurality of notifications, receiving, at the remote computing device and from the plurality of portable field devices, second data indicating results of the plurality of sensor operations, at 410. The results are generated by a plurality of tools (e.g., the plurality of tools 170) used to perform the plurality of sensor operations. The results may include a particular result (e.g., the result 142 or the result 144) of a particular sensor operation that is performed by a particular tool (e.g., the tool 172 or the tool 174) of the plurality of tools and that is received from a particular portable field device (e.g., the portable field device 152 or the portable field device 162) of the plurality of portable field devices. In one example, the remote computing device 110 is configured to receive the second data 140 and to store the second data 140 to the memory 114, and the one or more processors 112 are configured to execute the instructions 116 to retrieve the second data 140 from the memory 114.

The method 400 further includes performing, based on the results of the plurality of sensor operations, a plurality of remote structural health monitoring operations by the remote computing device to determine one or more structural health characteristics of each structure of the plurality of structures, at 412. To illustrate, a particular sensor operation may include a thickness monitoring operation or a condition monitoring operation, and performing at least one remote structural health monitoring operation of the plurality of structural health monitoring operations may include determining a thickness or a type of condition (e.g., acceptable, aged, or out-of-spec, etc.) of a particular structure. In this example, the one or more structural health characteristics may include a thickness or a type of condition of the particular structure. Alternatively or in addition, a structural health characteristic may correspond to another type of characteristic of a structure.

Although embodiments of the present application and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. Moreover, the scope of the present application is not intended to be limited to the particular embodiments of the process, machine, manufacture, composition of matter, means, methods and steps described in the specification.

The invention claimed is:

1. A method of performing remote structural health monitoring, the method comprising:
   receiving, at a remote computing device, first data indicating physical characteristics of a plurality of structures;
   based on the physical characteristics indicated by the first data, determining, by the remote computing device, a plurality of sensor operations associated with the plurality of structures;
   updating, by the remote computing device, a structural health management system to indicate the plurality of sensor operations, wherein at least some data of the structural health management system is remotely accessible to and remotely modifiable by a plurality of portable field devices via a communication interface of each portable field device of the plurality of portable field devices;
   after updating the structural health management system, sending a plurality of notifications to one or more of the plurality of portable field devices, wherein each notification of the plurality of notifications causes a respective graphical user interface (GUI) of each portable field device of the plurality of portable field devices to indicate one or more sensor operations of the plurality of sensor operations;
   in response to sending the plurality of notifications, receiving, at the remote computing device and from the plurality of portable field devices, second data indicating results of the plurality of sensor operations, the results generated by a plurality of tools used to perform the plurality of sensor operations;
   based on the results of the plurality of sensor operations, initiating a plurality of remote structural health monitoring operations by the remote computing device to determine one or more structural health characteristics of each structure of the plurality of structures, wherein the one or more structural health characteristics include a miscalibration of a particular tool of the plurality of tools; and
   based on the miscalibration of the particular tool, remotely initiating, by the remote computing device, recalibration of the particular tool.

2. The method of claim 1, wherein the results include a particular result of a particular sensor operation performed by the particular tool and received from a particular portable field device of the plurality of portable field devices, and further comprising detecting a fault condition based on the particular result.

3. The method of claim 2, wherein the fault condition corresponds to the miscalibration of the particular tool.

4. The method of claim 2, further comprising:
   determining a calibration status of the particular tool based on whether the particular result fails to satisfy a measurement threshold, the calibration status indicating whether the particular tool is calibrated correctly;
   based on whether the calibration status has a first value or a second value, determining whether to request the recalibration of the particular tool, the first value indicating the particular tool is calibrated correctly and the second value indicating the particular tool is calibrated incorrectly; and
   receiving a recalibrated result from the particular portable field device after the recalibration of the particular tool.

5. The method of claim 2, wherein the fault condition corresponds a defect of a particular structure of the plurality of structures, and further comprising sending, to the particular portable field device, a service request to service the particular structure.

6. The method of claim 1, further comprising causing, by the remote computing device, a particular portable field device of the plurality of portable field devices to transition a mode of operation of the particular tool.

7. The method of claim 6, wherein the mode of operation includes a duty cycle of the particular tool or a power on/off mode of the particular tool.

8. The method of claim 1, further comprising causing, by the remote computing device, a particular portable field device of the plurality of portable field devices to adjust one or more parameters of a particular sensor operation of the plurality of sensor operations and to repeat the particular sensor operation using the adjusted one or more parameters.

9. A remote computing device for remote structural health monitoring, the remote computing device comprising:
   a memory configured to store instructions; and
   one or more processors coupled to the memory and configured to execute the instructions to:
      receive first data indicating physical characteristics of a plurality of structures; based on the physical characteristics indicated by the first data, determine a plurality of sensor operations associated with the plurality of structures;
      update a structural health management system to indicate the plurality of sensor operations, wherein at least some data of the structural health management system is remotely accessible to and remotely modifiable by a plurality of portable field devices via a communication interface of each portable field device of the plurality of portable field devices;
      after updating the structural health management system, send a plurality of notifications to one or more of the plurality of portable field devices, wherein each notification of the plurality of notifications is configured to cause a respective graphical user interface (GUI) of each portable field device of the plurality of portable field devices to indicate one or more sensor operations of the plurality of sensor operations;

in response to sending the plurality of notifications, receive, from the plurality of portable field devices, second data indicating results of the plurality of sensor operations, the results generated by a plurality of tools used to perform the plurality of sensor operations;

based on the results of the plurality of sensor operations, initiate a plurality of remote structural health monitoring operations to determine one or more structural health characteristics of each structure of the plurality of structures, wherein the one or more structural health characteristics include a miscalibration of a particular tool of the plurality of tools; and based on the miscalibration of the particular tool, remotely initiate recalibration of the particular tool.

10. The remote computing device of claim 9, wherein the results include a particular result of a particular sensor operation performed by the particular tool and received from a particular portable field device of the plurality of portable field devices, and wherein the one or more processors are further configured to detect a fault condition based on the particular result.

11. The remote computing device of claim 10, wherein the fault condition corresponds to the miscalibration of the particular tool.

12. The remote computing device of claim 10, wherein the one or more processors are further configured to:

determine a calibration status of the particular tool based on whether the particular result fails to satisfy a measurement threshold, the calibration status indicating whether the particular tool is calibrated correctly;

based on whether the calibration status has a first value or a second value, determine whether to request the recalibration of the particular tool, the first value indicating the particular tool is calibrated correctly and the second value indicating the particular tool is calibrated incorrectly; and receive a recalibrated result from the particular portable field device after the recalibration of the particular tool.

13. The remote computing device of claim 10, wherein the fault condition corresponds a defect of a particular structure of the plurality of structures, and wherein the one or more processors are further configured to initiate sending, to the particular portable field device, a service request to service the structure.

14. The remote computing device of claim 9, wherein the remote computing device and the plurality of structures are separated by a physical distance, and wherein the one or more processors are further configured to apply one or more communication techniques to data communication between the remote computing device and the plurality of portable field devices to compensate for data errors associated with the physical distance.

15. The remote computing device of claim 14, wherein the one or more communication techniques include one or more modulation and coding schemes (MCSs).

16. A non-transitory computer-readable storage medium storing instructions that, when executed by one or more processors, cause the one or more processors to perform operations for remote structural health monitoring, the operations comprising:

receiving, at a remote computing device, first data indicating physical characteristics of a plurality of structures;

based on the physical characteristics indicated by the first data, determining, by the remote computing device, a plurality of sensor operations associated with the plurality of structures;

updating, by the remote computing device, a structural health management system to indicate the plurality of sensor operations, wherein at least some data of the structural health management system is remotely accessible to and remotely modifiable by a plurality of portable field devices via a communication interface of each portable field device of the plurality of portable field devices;

after updating the structural health management system, sending a plurality of notifications to one or more of the plurality of portable field devices, wherein each notification of the plurality of notifications causes a respective graphical user interface (GUI) of each portable field device of the plurality of portable field devices to indicate one or more sensor operations of the plurality of sensor operations;

in response to sending the plurality of notifications, receiving, at the remote computing device and from the plurality of portable field devices, second data indicating results of the plurality of sensor operations, the results generated by a plurality of tools used to perform the plurality of sensor operations;

based on the results of the plurality of sensor operations, initiating a plurality of remote structural health monitoring operations by the remote computing device to determine one or more structural health characteristics of each structure of the plurality of structures, wherein the one or more structural health characteristics include a miscalibration of a particular tool of the plurality of tools; and based on the miscalibration of the particular tool, remotely initiating, by the remote computing device, recalibration of the particular tool.

17. The non-transitory computer-readable storage medium of claim 16, wherein the operations further include, prior to updating the structural health management system, querying the structural health management system to determine whether one or more existing projects indicated by the structural health management system include an indication associated with a particular sensor operation.

18. The non-transitory computer-readable storage medium of claim 17, wherein updating the structural health management system includes, in response to determining that a particular project of the one or more existing projects includes the indication associated with the particular sensor operation, linking the particular sensor operation to the particular project.

19. The non-transitory computer-readable storage medium of claim 17, wherein updating the structural health management system includes, in response to failing to identify a particular project of the one or more existing projects that includes the indication associated with the particular sensor operation, adding the indication to the structural health management system.

20. The non-transitory computer-readable storage medium of claim 17, wherein the indication includes one or more of a location identifier of a particular structure of the plurality of structures or a type identifier associated with the particular sensor operation.

* * * * *

UNITED STATES PATENT AND TRADEMARK OFFICE
CERTIFICATE OF CORRECTION

PATENT NO. : 12,085,926 B2
APPLICATION NO. : 17/373685
DATED : September 10, 2024
INVENTOR(S) : Andrew Wilhelm et al.

It is certified that error appears in the above-identified patent and that said Letters Patent is hereby corrected as shown below:

In the Specification

At Column 8, Line number 25, delete "CIVIL" and replace with --CML--.
At Column 10, Line number 58, delete "(IVIFL)" and replace with --(MFL)--.
At Column 10, Line number 58, delete "CIVIL" and replace with --CML--.
At Column 10, Line number 58, delete "TML, data" and replace with --TML data--.
At Column 17, Line number 13, delete "sy stem" and replace with --system--.

Signed and Sealed this
Fifteenth Day of October, 2024

Katherine Kelly Vidal
*Director of the United States Patent and Trademark Office*